(12) United States Patent
Mao et al.

(10) Patent No.: US 9,185,552 B2
(45) Date of Patent: Nov. 10, 2015

(54) METHOD AND APPARATUS TO ESTABLISH TRUST AND SECURE CONNECTION VIA A MUTUALLY TRUSTED INTERMEDIARY

(75) Inventors: Yinian Mao, San Diego, CA (US); Peerapol Tinnakornsrisuphap, San Diego, CA (US); Anand Palanigounder, San Diego, CA (US); Jun Wang, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 772 days.

(21) Appl. No.: 12/774,257

(22) Filed: May 5, 2010

(65) Prior Publication Data

US 2010/0284304 A1    Nov. 11, 2010

Related U.S. Application Data

(60) Provisional application No. 61/176,049, filed on May 6, 2009.

(51) Int. Cl.
*H04W 12/02* (2009.01)
*H04W 84/04* (2009.01)
*H04L 29/06* (2006.01)

(52) U.S. Cl.
CPC ........... *H04W 12/02* (2013.01); *H04L 63/0428* (2013.01); *H04L 63/0471* (2013.01); *H04L 63/0272* (2013.01); *H04L 63/164* (2013.01); *H04W 84/045* (2013.01)

(58) Field of Classification Search
None
See application file for complete search history.

(56) References Cited

U.S. PATENT DOCUMENTS

| | | | | |
|---|---|---|---|---|
| 7,209,491 | B2 * | 4/2007 | Zheng et al. | 370/477 |
| 7,506,156 | B2 * | 3/2009 | Christensen et al. | 713/153 |
| 7,606,569 | B2 * | 10/2009 | Hori et al. | 455/436 |
| 2004/0103311 | A1 * | 5/2004 | Barton et al. | 713/201 |
| 2005/0083888 | A1 * | 4/2005 | Smee et al. | 370/332 |
| 2007/0147376 | A1 * | 6/2007 | Perlman et al. | 370/392 |
| 2007/0195727 | A1 * | 8/2007 | Kinder et al. | 370/328 |
| 2008/0051031 | A1 * | 2/2008 | Itoh et al. | 455/41.2 |
| 2008/0062891 | A1 * | 3/2008 | Van der Merwe et al. | 370/254 |
| 2008/0301797 | A1 * | 12/2008 | Mathai et al. | 726/12 |
| 2009/0113073 | A1 * | 4/2009 | Koide et al. | 709/245 |
| 2009/0129354 | A1 * | 5/2009 | Gupta et al. | 370/338 |
| 2010/0015921 | A1 * | 1/2010 | Yavuz et al. | 455/63.1 |
| 2010/0125899 | A1 * | 5/2010 | Tinnakornsrisuphap et al. | 726/12 |

(Continued)

FOREIGN PATENT DOCUMENTS

CN    1663198 A    8/2005
EP    1758310 A1    2/2007

OTHER PUBLICATIONS

3rd Generation Partnership Project, Technical Specification Group Radio Access Network, UTRAN architecture for 3G Home NodeB, Stage 2 (Release 8), 3GPP Standard, 3GPP TS 25.467, 3rd Generation Partnership Project (3GPP), Mobile Competence Centre , 650, Route des Lucioles , F-06921 Sophia-Antipolis Cedex, France, No. V8.1.0, Mar. 1, 2009, pp. 1-26, XP050369092.

(Continued)

*Primary Examiner* — Hicham Foud

(57) ABSTRACT

Systems and methods for establishing secure communications between two network elements through a trusted intermediary when no direct communication path is available. Separate secure communication links are established between the network elements and the trusted intermediary to facilitate secure end to end communication.

76 Claims, 15 Drawing Sheets

(56) References Cited

U.S. PATENT DOCUMENTS

| | | | |
|---|---|---|---|
| 2010/0125902 A1* | 5/2010 | Killian et al. | 726/15 |
| 2010/0260068 A1* | 10/2010 | Bhatt et al. | 370/254 |
| 2010/0260092 A1* | 10/2010 | Nagaraja | 370/315 |
| 2011/0093945 A1* | 4/2011 | Vikberg et al. | 726/12 |
| 2011/0202970 A1* | 8/2011 | Kato et al. | 726/1 |

OTHER PUBLICATIONS

3rd Generation Partnership Project, Technical Specification Group Service and System Apsects, Security of H(e)NB, (Release 8). Mar. 1, 2009, 3GPP Standard, 3GPP TR 33.820, 3rd Generation Partnership Project (3GPP), Mobile Competence Centre, 650, Route des Lucioles, F-06921 Sophia-Antipolis Cedex, France, pp. 1-75, XP050376885.
Broadband Forum, "TR-069 CPE WAN Management Protocol v1.1 Issue 1 Amendment 1" Broadband Forum Technical Report, No. Issue 1 Amendment 1, Nov. 30, 2006, pp. 1-138, XP002550467.
International Search Report and Written Opinion—PCT/US2010/033946. International Search Authority—European Patent Office—Jan. 2, 2011.
Samsung, "3G HNB—Protocol Stack Description based on Functions", 3GPP Draft.
R3-081337 3G HNB Procotocol Stack, 3rd Generation Partnership Project (3GPP), Mobile Competence Centre, 650, Route des Lucioles, F-06921 Sophia-Antipolis Cedex, France, vol. RAN WG3, No. Kansas City, USA, May 2, 2008, XP050164541O.
Tinnakornsrisuphap, P., et al., "Remote IP Access—FWG Discovery", 3GPP2 TSG-X Contribution,X50-20090330-062, Mar. 30, 2009.
Tinnakornsrisuphap, P., et al., "Remote IP Access—Stage 2 Architecture proposal for adoption", 3GPP2 TSG-X Contribution, X50-20090330-030, Mar. 30, 2009.
Taiwan Search Report—TW099114553—TIPO—Mar. 5, 2013.
3GPP2 A.S0017-D v1.0, Interoperability Specification (IOS) for CDMA2000 Access Network Interfaces—Part 7 (A10 and A11 Interfaces), Jun. 2007, 86 pp.
3GPP2: A.S008-C v1.0, "Interoperability Specification (IOS) for High Rate Packet Data (HRPD) Radio Access Network Interfaces with Session Control in the Access Network", Aug. 2007, pp. 1-640.
3GPP2: A.S009-C v1.0, "Interoperability Specification (IOS) for High Rate Packet Data (HRPD) Radio Access Network Interfaces with Session Control in the Packet Control Function", Aug. 2007, pp. 818.
3GPP2: "CDMA2000 Femtocell Network: Ix and IMS Network Aspects", X.50059-200-0 v1.0, Internet Citation, Jan. 1, 2010, pp. 1, 7-16, XP002639726, Y chapter 5.1.1.1 46-51, chapter 5.1.1.2 54-59, p. 5.1.2 62,63, chapter 8.3.
3GPP2: "CDMA2000 High Rate Packet Data Air Interface Specification", 3rd Generation Partnership Project 2, 3GPP2 C.S0024-B, Ver. 3.0, Sep. 2009, 1520 pages.
3GPP2 CS0005-0 Version 10, Upper Layer (Layer 3) Signaling Standard for CDMA2000 Spread Spectrum Systems, Version Date: Jul. 1999, pp. 1-576.

3GPP2: "Femtocell Security Framework", 3rd Generation Partnership Project 2, 3GPP2 S.S0132-0, v1.0, Jan. 2010, pp. 1-36.
3GPP2: "Interoperability Specification for Femto Access Points", 3rd Generation Partnership Project 2, 3GPP2 A.S0024-0 v0.1, Mar. 2009, 44 pages.
3GPP2: "Mobile IPv4 Enhancements", 3rd Generation Partnership Project 2, 3GPP2, X.S0044-0, Ver. 1.0, Sep. 17, 2010, 27 pages.
3GPP2: "Mobile IPv6 Enhancements," X.S0047-0 v1.0, pp. 1-33, Feb. 2009.
3GPP2: "Network PMIP Support," X.50061-0 v1.0, pp. 1-43, Dec. 5, 2008.
3rd Generation Partnership Project 2 "3GPP2", CDMA2000 Wireless IP Network Standard: Quality of Service and Header Reduction, 3GPP2 X.S0011-004-D, v2.0, Nov. 2008. pp. 1-68.
Aboba B., et al., "Extensible Authentication Protocol (EAP)", IETF: RFC 3748, Jun. 2004, pp. 1-67.
Aboba B., et al., "RADIUS (Remote Authentication Dial in User Service) Support for Extensible Authentication Protocol (EAP)", IETF: RFC 3579, Sep. 2003, pp. 1-42.
Arkko J., et al., "Extensible Authentication Protocol Method for 3rd Generation Authentication and Key Agreement (EAP-AKA)", Network Working Group, pp. 1-80, Jan. 2006.
Calhoun P., et al., "Diameter Network Access Server Application", IETF: RFC 4005, Aug. 2005, pp. 1-77.
Chiba M., et al., "Dynamic Authorization Extensions to Remote Authentication Dial in User Service (RADIUS)", IETF: RFC 5176, Jan. 2008, pp. 1-34.
Devarapalli V., et al., "Redirect Mechanism for IKEv2", IETF: Internet Draft "draft-ietf-ipsecme-ikev2-redirect-08.txt", Apr. 2009, pp. 1-13. 0.
Droms R., "Dynamic Host Configuration Protocol", IETF: RFC 1541, Mar. 1997, pp. 1-45.
Droms R., et al., "Dynamic Host Configuration Protocol for IPv6 (DHCPv6)", IETF: RFC 3315, Jul. 2003, pp. 1-92.
Huttunen A., et al., "UDP Encapsulation of IPsec ESP Packets", IETF: RFC 3948, Jan. 2005, pp. 1-15.
Kaufman C., et al., "Internet Key Exchange (IKEv2) Protocol; RFC 4306", IETF Standard, Internet Engineering Task Force, IETF, Dec. 2005, XP015043225, pp. 1-93.
Kent S., et al., "Security Architecture for the Internet Protocol", IETF: RFC 2401, Nov. 1998, pp. 1-60.
Kent S., et al., "IP Encapsulating Security Payload (ESP)", IETF: RFC 2406, Nov. 1998, pp. 1-22.
Korhonen J., et al., "Diameter Mobile Ipv6: Support for Home Agent to Diameter Server Interaction", draft-ietf-dime-mip6-split-16, Feb. 2010, pp. 1-34.
Plummer D-C., "An Ethernet Address Resolution Protocol", IETF: RFC 826, Nov. 1982, pp. 1-8.
Salowey J., et al., "Specification for the Derivation of Root Keys from an Extended Master Session Key (EMSK)", IETF: RFC5295, Aug. 2008, pp. 1-21.
Secure Hash Standard, FIPS 180-2, Aug. 1, 2002, pp. 1-75.
Zorn G., "Microsoft Vendor-specific Radius Attributes", IETF: RFC 2548, Mar. 1999, pp. 1-41.

\* cited by examiner

METHOD AND APPARATUS TO ESTABLISH TRUST AND SECURE CONNECTION VIA A MUTUALLY TRUSTED INTERMEDIARY

CLAIM OF PRIORITY UNDER 35 U.S.C. §119

The present Application for Patent claims priority to U.S. Provisional Application No. 61/176,049, entitled "METHOD AND APPARATUS TO ESTABLISH TRUST AND SECURE CONNECTION VIA A MUTUALLY TRUSTED INTERMEDIARY," filed May 6, 2009. The above-referenced application is hereby expressly incorporated by reference herein.

BACKGROUND

1. Field

The present application relates generally to wireless communication, and more specifically to systems and methods for establishing secure connections between devices through a mutually trusted intermediary.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB), femto access points, or femto nodes. Typically, such miniature base stations are connected to the Internet and the mobile operator's network via a DSL router or a cable modem. Multiple femto nodes may be deployed by individual users in the coverage area of a traditional macro node. Femto nodes may form part of local networks and may be connected to various devices. A user may wish to interact with those devices on the local networks even when located remotely from the femto node. Thus, it may be desirable to enable a secure connection with the femto node and its local network even when the user cannot directly communicate with the femto node.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include identifying a plurality of nodes using limited resources.

In one aspect, the disclosure provides a method of wireless communication. The method includes determining, by a first apparatus, a second apparatus capable of forming a first secure communication link with a third apparatus, establishing, by the first apparatus, a second secure communication link with the second apparatus, receiving, by the first apparatus, an indication from the second apparatus that the first secure communication link has been established, and transmitting, by the first apparatus, a communication to the second apparatus via the second secure communication link for retransmission to the third apparatus via the first secure communication link by the second apparatus. The communication includes an identifier associated with the third apparatus.

In another aspect, the disclosure provides an apparatus for wireless communication. The apparatus includes a processor configured to determine a second apparatus capable of forming a first secure communication link with a third apparatus and to establish a second secure communication link with the second apparatus. The apparatus also includes a receiver configured to receive an indication from the second apparatus that the first secure communication link has been established and a transmitter configured to transmit a communication to the second apparatus via the second secure communication link for retransmission to the third apparatus via the first secure communication link by the second apparatus. The communication includes an identifier associated with the third apparatus.

In another aspect the disclosure provides an apparatus for wireless communication. The apparatus includes means for determining a second apparatus capable of forming a first secure communication link with a third apparatus, means for establishing a second secure communication link with the second apparatus, means for receiving an indication from the second apparatus that the first secure communication link has been established, and means for transmitting a communication to the second apparatus via the second secure communication link for retransmission to the third apparatus via the first secure communication link by the second apparatus. The communication includes an identifier associated with the third apparatus.

In another aspect, the disclosure provides a computer program product. The computer program product includes a computer-readable medium. The computer-readable medium includes code for causing a computer to determine a second apparatus capable of forming a first secure communication link with a third apparatus, code for causing a computer to establish a second secure communication link between a first apparatus and the second apparatus, code for causing a computer to receive an indication from the second apparatus that the first secure communication link has been established, and code for causing a computer to transmit a communication to the second apparatus via the second secure communication link for retransmission to the third apparatus via the first secure communication link by the second apparatus. The communication includes an identifier associated with the third apparatus.

In another aspect, the disclosure provides a method of wireless communication. The method includes establishing, by a first apparatus, a first secure communication link with a second apparatus, establishing by the first apparatus, a second secure communication link with a third apparatus, receiving, by the first apparatus, a first communication from the second device via the first secure communication link, the first communication comprising an identifier associated with the third apparatus, generating, by the first apparatus, a second communication based, at least in part, on the first communication and the third identifier, and transmitting, by the first apparatus, the second communication to the third apparatus.

In another aspect, the disclosure provides an apparatus for wireless communication. The apparatus includes a processor configured to establish a first secure communication link with a second apparatus and to establish a second secure communication link with a third apparatus. The apparatus also includes a receiver configured to receive a first communication from the second device via the first secure communication link, the first communication comprising an identifier associated with the third apparatus. The processor is also configured to generate a second communication based, at least in part, on the first communication and the third identifier. The apparatus also includes a transmitter configured to transmit the second communication to the third apparatus.

In another embodiment, the disclosure provides an apparatus for wireless communication. The apparatus includes means for establishing a first secure communication link with a second apparatus, means for establishing a second secure communication link with a third apparatus, means for receiving a first communication from the second device via the first secure communication link, the first communication comprising an identifier associated with the third apparatus, means for generating a second communication based, at least in part, on the first communication and the third identifier, and means for transmitting the second communication to the third apparatus.

In another embodiment, the disclosure provides a computer program product. The computer program product includes a computer-readable medium. The computer-readable medium includes code for causing a computer to establish a first secure communication between a first apparatus and a second apparatus, code for causing a computer to establish a second secure communication link between the first apparatus and a third apparatus, code for causing a computer to receive a first communication from the second device via the first secure communication link, the first communication comprising an identifier associated with the third apparatus, code for causing a computer to generate a second communication based, at least in part, on the first communication and the third identifier, and code for causing a computer to transmit the second communication to the third apparatus.

In another embodiment, the disclosure provides a method of wireless communication. The method includes establishing, by a first apparatus, a first secure communication link with second apparatus, and receiving, by the first apparatus, a communication from the second apparatus via the first secure communication link. The communication includes an identifier associated with a third apparatus which transmitted the communication to the second apparatus via a second secure communication link.

In another aspect, the disclosure provides an apparatus for wireless communication. The apparatus includes a processor configured to establish a first secure communication link with a second apparatus and a receiver configured to receive a communication from the second apparatus via the first secure communication link. The communication includes an identifier associated with a third apparatus which transmitted the communication to the second apparatus via a second secure communication link.

In another aspect, the disclosure provides an apparatus for wireless communication. The apparatus includes means for establishing a first secure communication link with a second apparatus and means for receiving a communication from the second apparatus via the first secure communication link. The communication includes an identifier associated with a third apparatus which transmitted the communication to the second apparatus via a second secure communication link.

In another aspect, the disclosure provides a computer program product. The computer program product includes a computer-readable medium. The computer-readable medium includes code for causing a computer to establish a first secure communication link between a first apparatus and a second apparatus and code for causing a computer to means for receive a communication from the second apparatus via the first secure communication link. The communication comprises an identifier associated with a third apparatus which transmitted the communication to the second apparatus via a second secure communication link.

DETAILED DESCRIPTION

Figure 1:
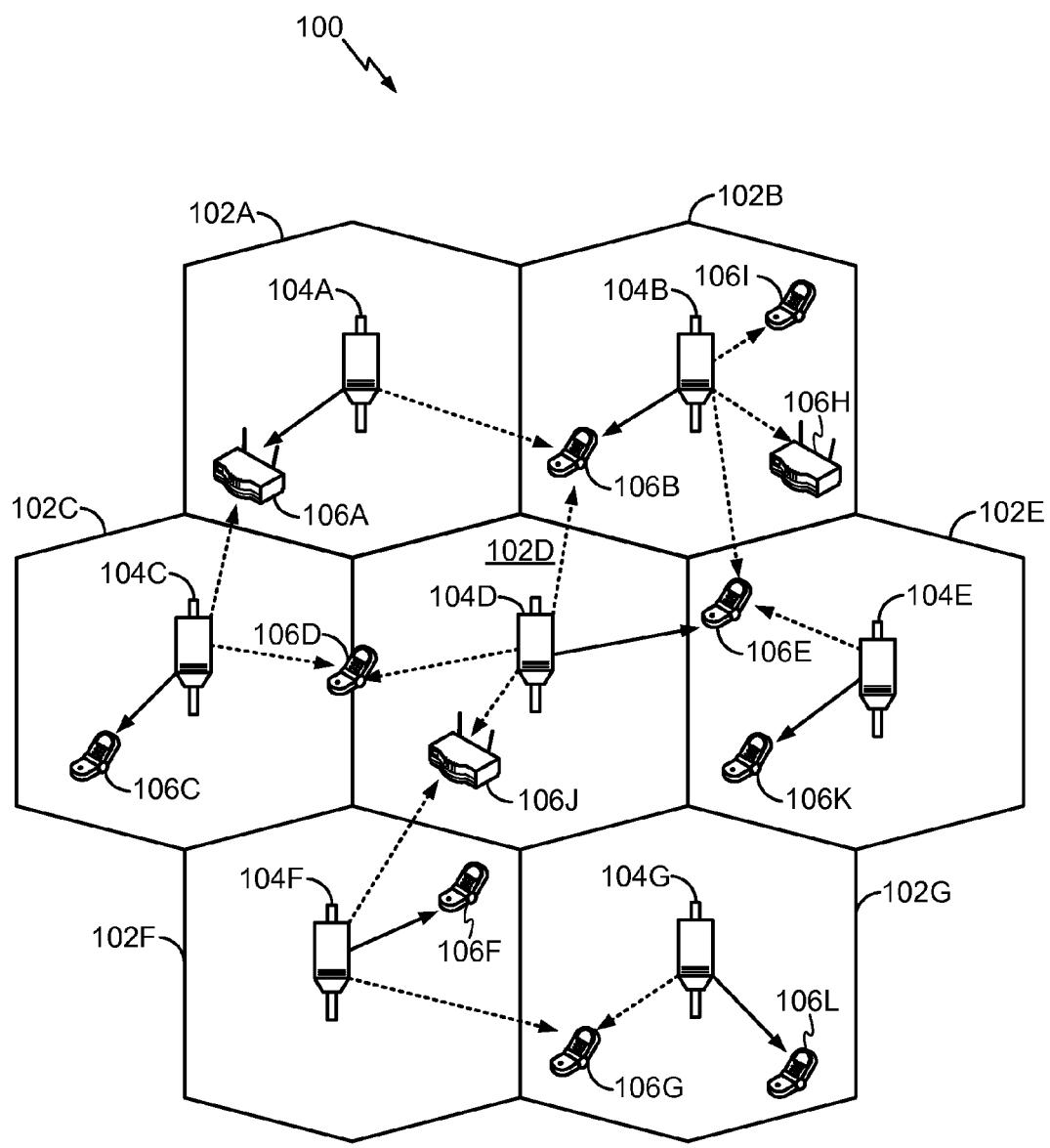
FIG. 1 illustrates an exemplary wireless communication network.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As a user equipment ("UE") moves through such a network, the user equipment may be served in certain locations by access nodes ("ANs") that provide macro coverage while the user equipment may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

FIG. 1 illustrates an exemplary wireless communication network 100. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104, such as, for example, nodes 104a-104g. Each node 104 may provide communication coverage to a corresponding cell 102. The nodes 104 may interact with a plurality of user equipments (UEs), such as, for example, UEs 106a-106l.

Each UE 106 may communicate with one or more nodes 104 on a forward link (FL) and/or a reverse link (RL) at a given moment. A FL is a communication link from a node to a UE. A RL is a communication link from a UE to a node. The nodes 104 may be interconnected, for example, by appropriate wired or wireless interfaces and may be able to communicate with each other. Accordingly, each UE 106 may communicate with another UE 106 through one or more nodes 104. For example, the UE 106j may communicate with the UE 106h as follows. The UE 106j may communicate with the node 104d. The node 104d may then communicate with the node 104b. The node 104b may then communicate with the UE 106h. Accordingly, a communication is established between the UE 106j and the UE 106h.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide a user equipment (UE) 106 access within its coverage area to a communications network, such as, for example the internet or a cellular network.

A UE 106 may be a wireless communication device (e.g., a mobile phone, router, personal computer, server, etc.) used by a user to send and receive voice or data over a communications network. A user equipment (UE) may also be referred to herein as an access terminal (AT), as a mobile station (MS), or as a terminal device. As shown, UEs 106a, 106h, and 106j comprise routers. UEs 106b-106g, 106i, 106k, and 106l comprise mobile phones. However, each of UEs 106a-106l may comprise any suitable communication device.

Figure 2:
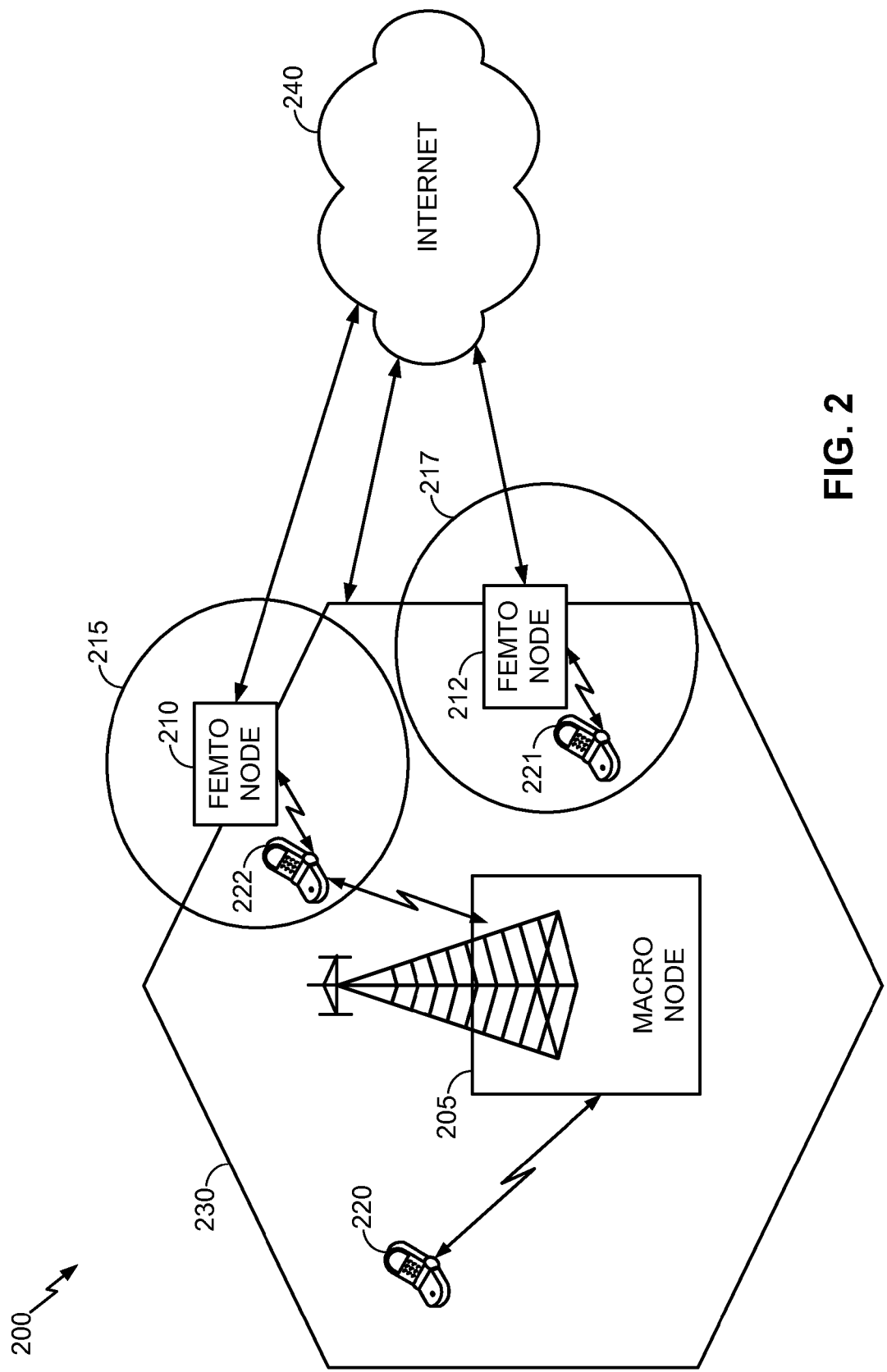
FIG. 2 illustrates exemplary interoperations of two or more communication networks.

FIG. 2 illustrates exemplary interoperations of two or more communication networks. It may be desirable for a UE 220 to transmit information to and receive information from another UE such as UE 221. FIG. 2 illustrates a manner in which the UEs 220, 221, and 222 may communicate with each other. As shown in FIG. 2, the macro node 205 may provide communication coverage to user equipments within a macro area 230. For example, the UE 220 may generate and transmit a message to the macro node 205. The message may comprise information related to various types of communication (e.g., voice, data, multimedia services, etc.). The UE 220 may communicate with the macro node 205 via a wireless link. The macro node 205 may communicate with a network 240 via a wired link or via a wireless link. The femto nodes 210 and 212 may also communicate with the network 240 via a wired link or via a wireless link. The UE 222 may communicate with the femto node 210 via a wireless link and the UE 221 may communicate with the femto node 212 via a wireless link.

The macro node 205 may also communicate with devices such as servers (not shown in FIG. 2) and switching centers (not shown in FIG. 2) through the network 240. For example, the macro node 205 may transmit the message received from the UE 220 to a switching center (not shown in FIG. 2), which may forward the message to another network. The network 240 may also be used to facilitate communication between the UEs 220, 221, and 222. For example, the UE 220 may be in communication with the UE 221. The UE 220 may transmit a message to the macro node 205. The macro node 205 may forward the message to the network 240. The network 240 may forward the messages to the femto node 212. The femto node 212 may forward the message to the UE 221. Similarly, the reverse path may be followed from the UE 221 to the UE 220. In another example, the UE 221 may be in communication with the UE 222. The UE 221 may transmit a message to the femto node 212. The femto node 212 may forward the message to the network 240. The network 240 may forward the message to the femto node 210. The femto node 210 may forward the message to the UE 222. Similarly, the reverse path may be followed from the UE 222 to the UE 221.

In one embodiment, the femto nodes 210, 212 may be deployed by individual consumers and placed in homes, apartment buildings, office buildings, and the like. The femto nodes 210, 212 may communicate with the UEs in a predetermined range (e.g., 100 m) of the femto nodes 210, 212 utilizing a predetermined cellular transmission band. In one embodiment, the femto nodes 210, 212 may communicate with the network 240 by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or other link.

The network 240 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the network 240 includes network variations such as the public Internet, a private network within the Internet, a secure network within the Internet, a private network, a public network, a value-added network, an intranet, and the like. In certain embodiments, network 240 may also comprise a virtual private network (VPN).

Figure 3:
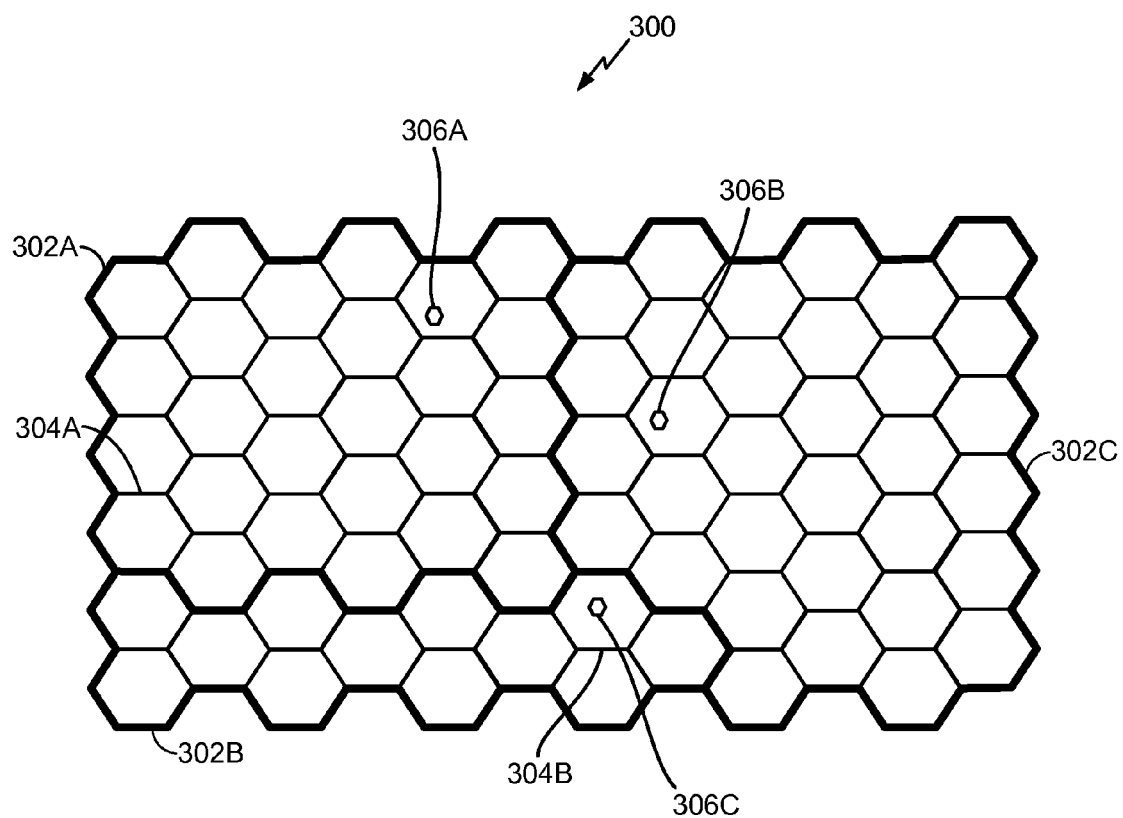
FIG. 3 illustrates exemplary coverage areas of the wireless communication networks shown in FIGS. 1 and 2.

FIG. 3 illustrates exemplary coverage areas of the wireless communication networks 100 and 200 shown in FIGS. 1 and 2. The coverage area 300 may comprise one or more geographical areas in which the UE 220 may access the communication network 240 as discussed above with respect to FIG. 2. As shown the coverage area 300 comprises several tracking areas 302 (or routing areas or location areas). Each tracking area 302 comprises several macro areas 304, which may be similar to the macro area 230 described above with respect to FIG. 2. Here, areas of coverage associated with tracking areas 302A, 302B, and 302C are shown as delineated by wide lines as and the macro areas 304 are represented by hexagons. The tracking areas 302 may also comprise femto areas 306, which may be similar to the femto area 230 described above with respect to FIG. 2. In this example, each of the femto areas 306 (e.g., femto area 306C) is depicted within a macro area 304 (e.g., macro area 304B). It should be appreciated, however, that a femto area 306 may not lie entirely within a macro area 304. In practice, a large number of femto areas 306 may be defined with a given tracking area 302 or macro area 304. Also, one or more pico areas (not shown) may be defined within a given tracking area 302 or macro area 304. As described below, in some embodiments, the femto areas 306 may comprise local networks which facilitate network communication access by one or more local network devices. It may be desirable for a UE 220 to communicate with one or more of the devices in a femto area local network even when the UE 220 is located remotely. Systems and methods for facilitating secure remote access to femto area local networks are described herein.

For convenience, the disclosure herein describes various functionalities related to a femto node. It should be appreciated, however, that a pico node may provide the same or similar functionality for a larger coverage area. For example, a pico node may be restricted, a home pico node may be defined for a given user equipment, and so on.

A wireless multiple-access communication system may simultaneously support communication for multiple wireless user equipments. As mentioned above, each user equipment may communicate with one or more nodes via transmissions on the forward and reverse links. The forward link (or downlink) refers to the communication link from the node to the user equipment, and the reverse link (or uplink) refers to the communication link from the user equipment to the node. This communication link may be established via a single-in-single-out system, a multiple-in-multiple-out ("MIMO") system, or some other type of system.

A MIMO system employs multiple (NT) transmit antennas and multiple (NR) receive antennas for data transmission. A MIMO channel formed by the NT transmit and NR receive antennas may be comprise NS independent channels, which are also referred to as spatial channels, where NS≤min {NT, NR}. Each of the NS independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables a device (e.g., a node, a user equipment, etc.) to extract a transmit beam-forming gain on the forward link when multiple antennas are available at the device.

The teachings herein may be incorporated into a device (e.g., a node, a user equipment, etc.) employing various components for communicating with at least one other device.

Figure 4:
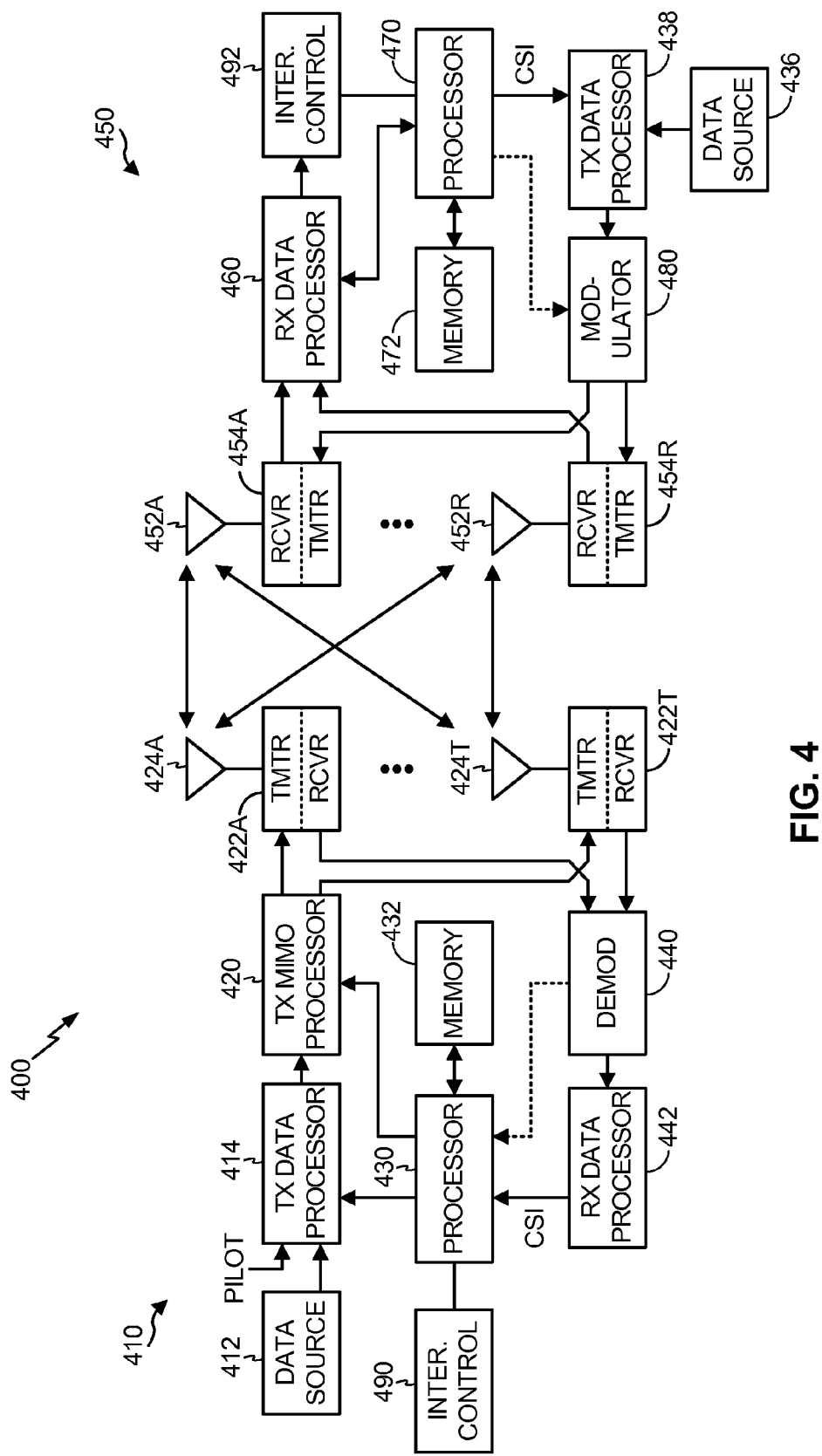
FIG. 4 is a functional block diagram of a first exemplary femto node and a first exemplary user equipment in one of the communication networks of FIG. 2.

FIG. 4 is a functional block diagram of a first exemplary femto node 410 and a first exemplary user equipment 450 in one of the communication networks of FIG. 2. As shown, a MIMO system 400 comprises a femto node 410 and a user equipment 450 (e.g., the UE 222). At the femto node 410, traffic data for a number of data streams is provided from a data source 412 to a transmit ("TX") data processor 414.

In one embodiment, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 430. A data memory 432 may store program code, data, and other information used by the processor 430 or other components of the femto node 410.

The modulation symbols for all data streams are then provided to a TX MIMO processor 420, which may further process the modulation symbols (e.g., for OFDM). The TX MIMO processor 420 then provides NT modulation symbol streams to NT transceivers ("XCVR") 422A through 422T. In some aspects, the TX MIMO processor 420 applies beamforming weights to the symbols of the data streams and to the antenna from which the symbol is being transmitted.

Each transceiver 422 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 422A through 422T are then transmitted from NT antennas 424A through 424T, respectively.

At the femto node 450, the transmitted modulated signals are received by NR antennas 452A through 452R and the received signal from each antenna 452 is provided to a respective transceiver ("XCVR") 454A through 454R. Each transceiver 454 conditions (e.g., filters, amplifies, and downconverts) a respective received signal, digitizes the conditioned signal to provide samples, and further processes the samples to provide a corresponding "received" symbol stream.

A receive ("RX") data processor 460 then receives and processes the NR received symbol streams from NR transceivers 454 based on a particular receiver processing technique to provide NT "detected" symbol streams. The RX data processor 460 then demodulates, deinterleaves, and decodes each detected symbol stream to recover the traffic data for the data stream. The processing performed by the RX data processor 460 is complementary to that performed by the TX MIMO processor 420 and the TX data processor 414 at the femto node 410.

A processor 470 periodically determines which pre-coding matrix to use (discussed below). The processor 470 formulates a reverse link message comprising a matrix index portion and a rank value portion. A data memory 472 may store program code, data, and other information used by the processor 470 or other components of the femto node 450.

The reverse link message may comprise various types of information regarding the communication link and/or the received data stream. The reverse link message is then processed by a TX data processor 438. The TX data processor 438 also receives traffic data for a number of data streams from a data source 436. The modulator 480 modulates the data streams. Further, the transceivers 454A through 454R condition the data streams and transmits the data streams back to the femto node 410.

At the femto node 410, the modulated signals from the femto node 450 are received by the antennas 424. Further, the transceivers 422 condition the modulated signals. A demodulator ("DEMOD") 440 demodulates the modulated signals. A RX data processor 442 processes the demodulated signals and extracts the reverse link message transmitted by the femto node 450. The processor 430 then determines which pre-coding matrix to use for determining the beam-forming weights. Further, the processor 430 processes the extracted message.

Further, the femto node 410 and/or the femto node 450 may comprise one or more components that perform interference control operations as taught herein. For example, an interference ("INTER") control component 490 may cooperate with the processor 430 and/or other components of the femto node 410 to send/receive signals to/from another device (e.g., femto node 450) as taught herein. Similarly, an interference control component 492 may cooperate with the processor 470 and/or other components of the femto node 450 to send/receive signals to/from another device (e.g., femto node 410). It should be appreciated that for each femto node 410 and 450 the functionality of two or more of the described components may be provided by a single component. For example, a single processing component may provide the functionality of the interference control component 490 and the processor 430. Further, a single processing component may provide the functionality of the interference control component 492 and the processor 470.

Figure 5:
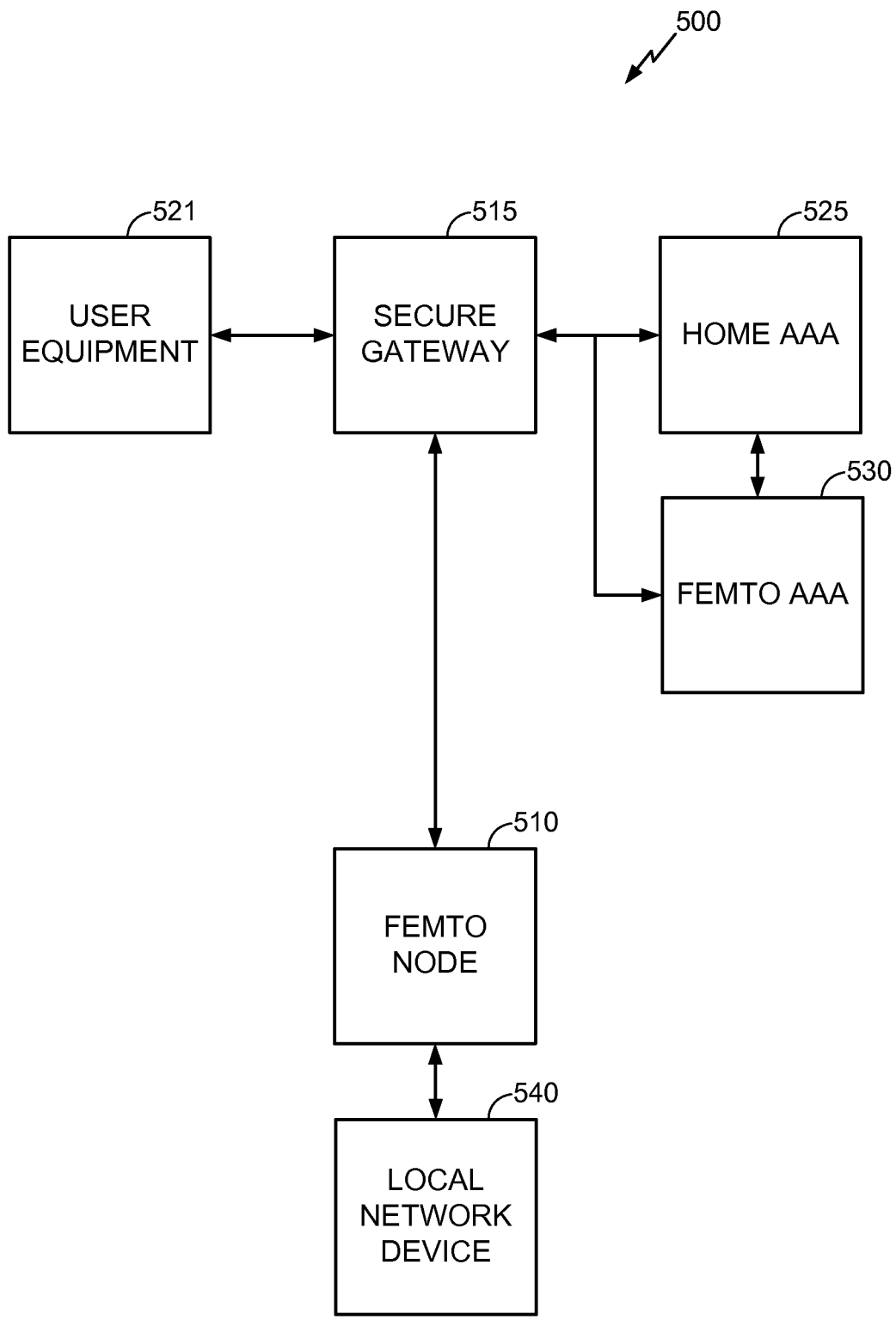
FIG. 5 illustrates additional exemplary operations of a communication network.

FIG. 5 illustrates additional exemplary operations of a communication network 501. The communication network 501 comprises a femto node 510. The femto node 510 may be similar to the femto node 210 of FIG. 2. In addition to providing communication access for UE's the femto node 510 may be configured to communicate with local devices such as a local network device 540. In one example, the local network device 540 may comprise a file server. Thus, when a UE is located within communication range of the femto node 510, the UE may communicate with the local network device 540 via the femto node 510. Any security requirements for communications between the femto node 510 and the UE may be handled through direct communication between the two entities. However, a remotely located UE, such as the UE 521, may also want to communicate with the local network device 540. For example, a user of the UE 521 may want to access files or services on the local network device 540 when located beyond the communication range of the femto node 510. In this case, no direct communication path may exist between the UE 521 and the Femto node 510. When no direct access is available, remote access of the femto node 510 by the UE 521 may be facilitated by an intermediary such as a secure gateway (SeGW) 515.

In general, a secure gateway acts as an intermediary between femto nodes and a network operator's core network. SeGW 515 may communicate with femto node 510 via a network such as the Internet. SeGW 515 may also be configured to relay messages between the femto node 510 and the UE 521. For example, SeGW 515 may receive a communication from the UE 521 and forward the communication to the femto node 510. In one embodiment, the UE 521 and the SeGW 515 communicate via an IP connectivity access network using, for example, high rate packet data (HRPD) protocol. These communications may be routed through the operator's core network and may make use of network elements such as the base station 205. In order to facilitate communication between the UE 521 and the femto node 510, the SeGW 515 may communicate with one or more authentication, authorization, and accounting (AAA) servers such as the home AAA server 525 and the femto AAA server 530. The AAA servers 525, 530 allow the SeGW 515 to verify that the communication between the UE 521 and the femto node 510 is authorized.

A UE 521 may desire to communicate securely with a femto node 510 even when the no direct communication path is available. In one embodiment, in order to facilitate such secure communication, the SeGW 515 may be used as a trusted intermediary between the UE 521 and the femto node 510. In particular, as described in greater detail below, the SeGW 515 may establish a first secure link with the UE 521 and a second with the femto node 510. The SeGW 515 may receive communications over one of the respective and transmit the communications over the other respective links. Further, as the links may have different characteristics, the SeGW 515 may process or reformat an incoming communication before transmitting the communication over the other secure link. Advantageously, by acting as a trusted intermediary, the SeGW enables secure remote access of the femto node 510 by the UE 521. More generally, the use of a trusted intermediary by network entities may advantageously facilitate secure communication where no direct communication link between the network entities exists. Additional details and examples are discussed with respect to the figures and examples below.

Figure 6:
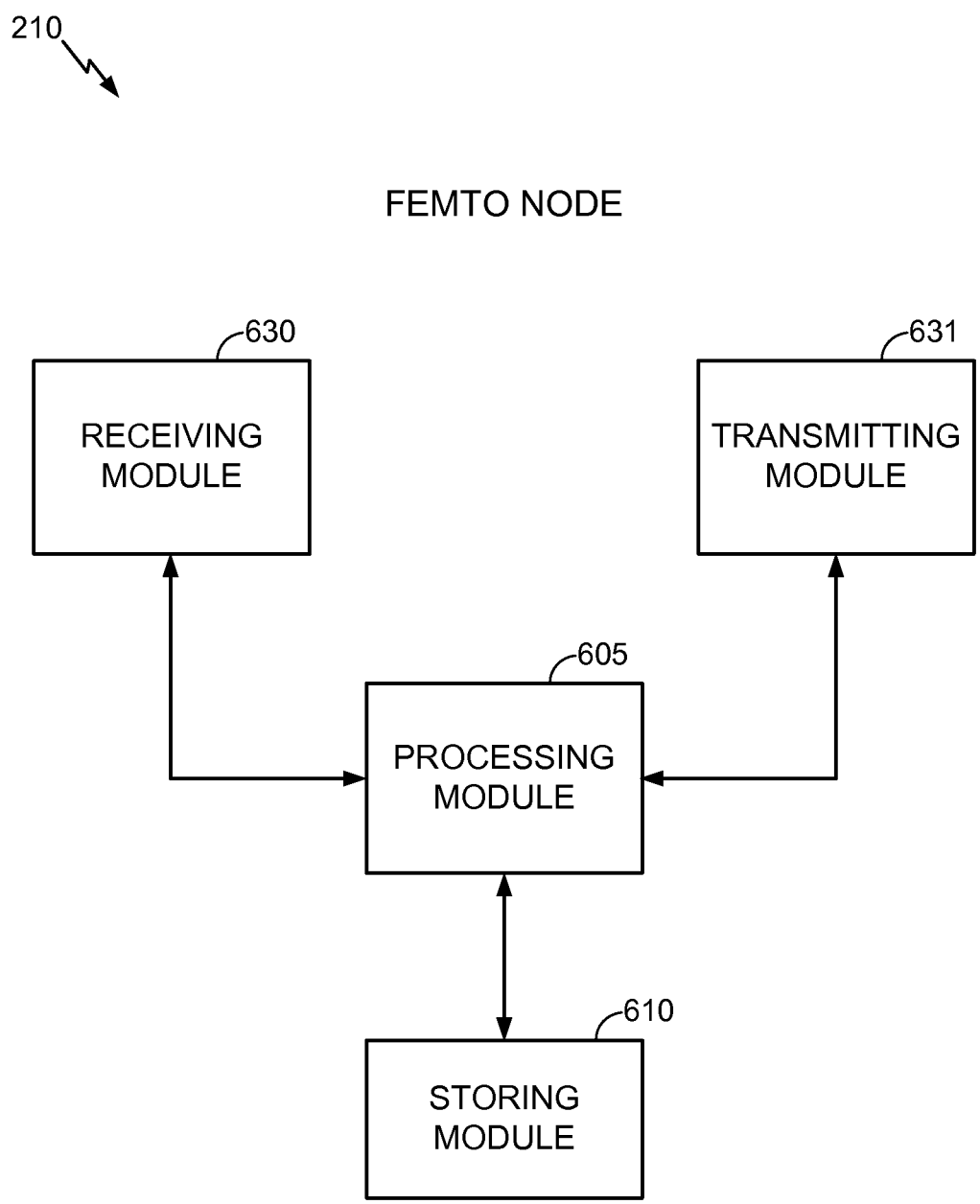
FIG. 6 is a functional block diagram of a second exemplary femto node in the communication network of FIG. 5.

FIG. 6 is a functional block diagram of an exemplary femto node 210 in the communication network of FIG. 5. The femto node 210 may be similar to the femto node 510 of FIG. 5. The femto node 210 may comprise a transmitting module 631. The transmitting module 631 may transmit outbound messages to other devices, such as, for example, the SeGW 515 and the local network device 540 of FIG. 5. The messages may include secure link negotiation messages or messages for the UE 521. Femto node 210 may also comprise a receiving module 630 configured to receive inbound messages from devices such as the SeGW 515 and the local network device 540. The receiving module 630 and the transmitting module 631 may be coupled to a processing module 605. The receiving module 630 may pass an inbound message to the processing module 605 for processing. The processing module 605 may process and pass an outbound message to the transmitting module 631 for transmission. The processing module 605 may be configured to process the inbound and outbound wired and wireless messages via the receiving module 630 and the transmitting module 631. The processing module 605 may also be configured to control other components of the femto node 210.

The processing module 605 may further be coupled, via one or more buses, to a storing module 610. The processing module 605 may read information from or write information to the storing module 610. For example, the storing module 610 may be configured to store inbound our outbound messages before, during, or after processing. In particular, the storing module 610 may be configured to store information relating secure link negotiation.

The receiving module 630 and the transmitting module 631 may comprise an antenna and a transceiver. The transceiver may be configured to modulate/demodulate the wireless outbound/inbound messages going to or coming from local network device 540 or another UE. The wireless outbound/inbound messages may be transmitted/received via the antenna. The antenna may be configured to send and/or receive the outbound/inbound wireless messages over one or more channels. The receiving module 630 may demodulate the data received. The transmitting module 631 may modulate data to be sent from the femto node 210. The processing module 605 may provide data to be transmitted.

The receiving module 630 and the transmitting module 631 may further comprise a modem. The modem may be configured to modulate/demodulate the outbound/inbound wired messages going to or coming from the SeGW 515. The receiving module 630 may demodulate data received. The demodulated data may be transmitted to the processing module 605. The transmitting module 631 may modulate data to be sent from the femto node 210. The processing module 605 may provide data to be transmitted.

The storing module 610 may comprise processing module cache, including a multi-level hierarchical cache in which different levels have different capacities and access speeds. The storing module 610 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the femto node 210 need not be separate structural elements. For example, the processing module 605 and the storing module 610 may be embodied in a single chip. The processing module 605 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the femto node 210, such as the processing module 605, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 610 may also be implemented as a combination of computing devices, e.g., a combination of a DSP and a microprocessor, a plurality of microprocessors, one or more microprocessors in conjunction with a DSP communication, or any other such configuration.

Figure 7:
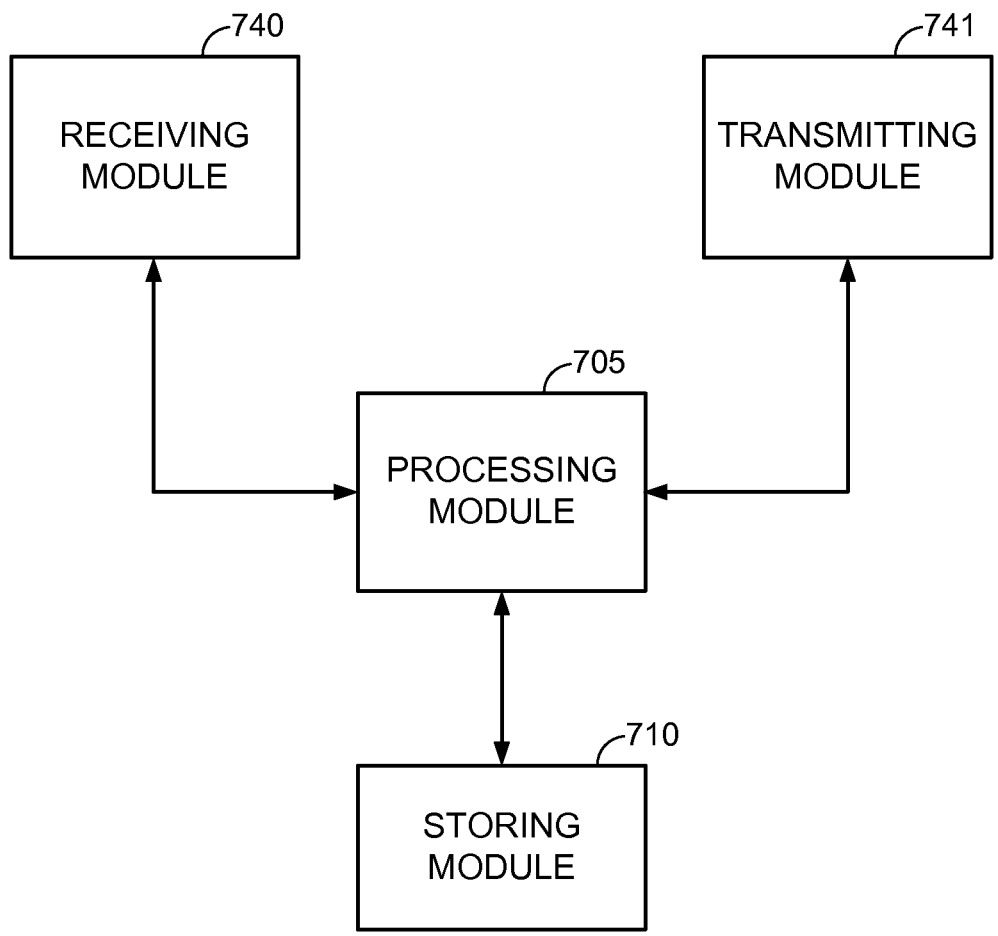
FIG. 7 is a functional block diagram of a second exemplary user equipment in the communication network of FIG. 5.

FIG. 7 is a functional block diagram of an exemplary UE 221 in the communication network of FIG. 5. The UE 221 may be similar to the UE 521 of FIG. 5. The UE 221 may comprise a transmitting module 741. The transmitting module 741 may transmit outbound messages to other devices, such as, for example, the SeGW 515. The messages may include secure link negotiation messages or messages for the femto node 510. The UE 221 may also comprise a receiving module 740 configured to receive inbound messages from devices such as the SeGW 515. The receiving module 740 and the transmitting module 741 may be coupled to a processing module 705. The receiving module 740 may pass an inbound message to the processing module 705 for processing. The processing module 705 may process and pass an outbound message to the transmitting module 741 for transmission. The processing module 705 may be configured to process the inbound and outbound wireless messages coming from or going to the SeGW 515 via the receiving module 740 and the transmitting module 741. The processing module 705 may also be configured to control other components of the UE 221.

The processing module 705 may further be coupled, via one or more buses, to a storing module 710. The processing module 705 may read information from or write information to the storing module 710. For example, the storing module 710 may be configured to store inbound our outbound messages before, during, or after processing. In particular, the storing module 710 may be configured to store information relating secure link negotiation.

The receiving module 730 and the transmitting module 731 may comprise an antenna and a transceiver. The transceiver may be configured to modulate/demodulate the wireless outbound/inbound messages going to or coming from local network device 540 or another UE. The wireless outbound/inbound messages may be transmitted/received via the antenna. The antenna may be configured to send and/or receive the outbound/inbound wireless messages over one or more channels. The receiving module 730 may demodulate the data received. The transmitting module 731 may modulate data to be sent from the UE 221. The processing module 705 may provide data to be transmitted.

The storing module 710 may comprise processing module cache, including a multi-level hierarchical cache in which different levels have different capacities and access speeds. The storing module 710 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the UE 221 need not be separate structural elements. For example, the processing module 705 and the storing module 710 may be embodied in a single chip. The processing module 705 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the UE 221, such as the processing module 705, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 710 may also be implemented as a combination of computing devices, e.g., a combination of a DSP and a microprocessor, a plurality of microprocessors, one or more microprocessors in conjunction with a DSP communication, or any other such configuration.

Figure 8:
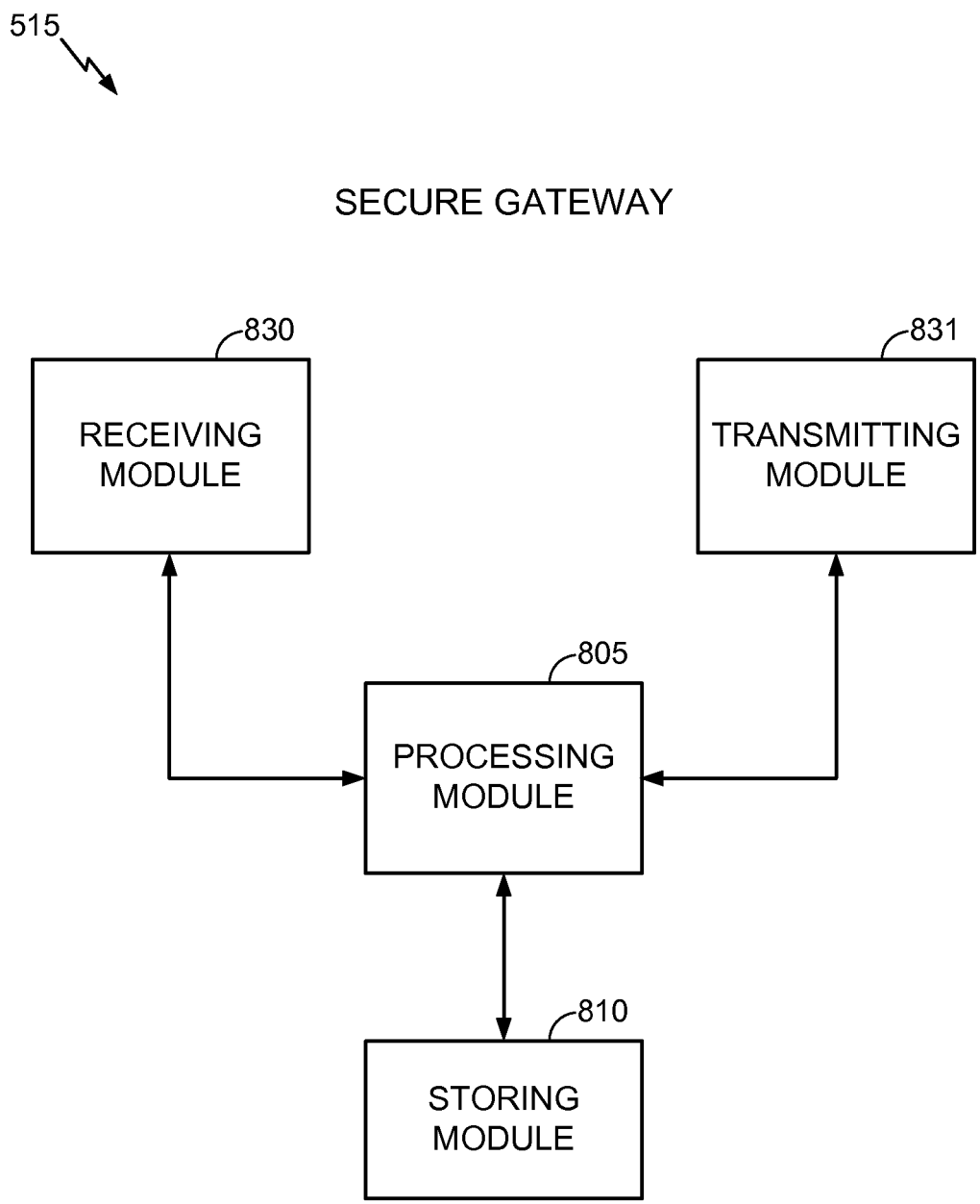
FIG. 8 is a functional block diagram of an exemplary secure gateway in the communication network of FIG. 5.

FIG. 8 is a functional block diagram of an exemplary SeGW 515 in the communication network of FIG. 5. The SEGW 515 may comprise a transmitting module 831. The transmitting module 831 may transmit outbound messages to other devices, such as, for example, the UE 521 and femto node 510 of FIG. 5. The messages may include secure link negotiation messages or messages intended for the femto node 510 and UE 521. The SEGW 515 may also comprise a receiving module 830 configured to receive inbound messages from devices such as the femto node 510 and UE 521. The receiving module 830 and the transmitting module 831 may be coupled to a processing module 805. The receiving module 830 may pass an inbound message to the processing module 805 for processing. The processing module 805 may process and pass an outbound message to the transmitting module 831 for transmission. The processing module 805 may be configured to process the inbound and outbound wired via the receiving module 830 and the transmitting module 831. The processing module 805 may also be configured to control other components of the SEGW 515.

The processing module 805 may further be coupled, via one or more buses, to a storing module 810. The processing module 805 may read information from or write information to the storing module 810. For example, the storing module 810 may be configured to store inbound our outbound messages before, during, or after processing. In particular, the storing module 810 may be configured to store information relating secure link negotiation.

The receiving module 830 and the transmitting module 831 may comprise a modem. The modem may be configured to modulate/demodulate the outbound/inbound wired messages going to or coming from the SeGW 515. The receiving module 830 may demodulate data received. The demodulated data may be transmitted to the processing module 805. The transmitting module 831 may modulate data to be sent from the SeGW 515. The processing module 805 may provide data to be transmitted.

The storing module 810 may comprise processing module cache, including a multi-level hierarchical cache in which different levels have different capacities and access speeds. The storing module 810 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the SEGW 515 need not be separate structural elements. For example, the processing module 805 and the storing module 810 may be embodied in a single chip. The processing module 805 may additionally, or in the alternative, contain memory, such as registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the SEGW 515, such as the processing module 805, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the femto node 810 may also be implemented as a combination of computing devices, e.g., a combination of a DSP and a microprocessor, a plurality of microprocessors, one or more microprocessors in conjunction with a DSP communication, or any other such configuration.

Figure 9:
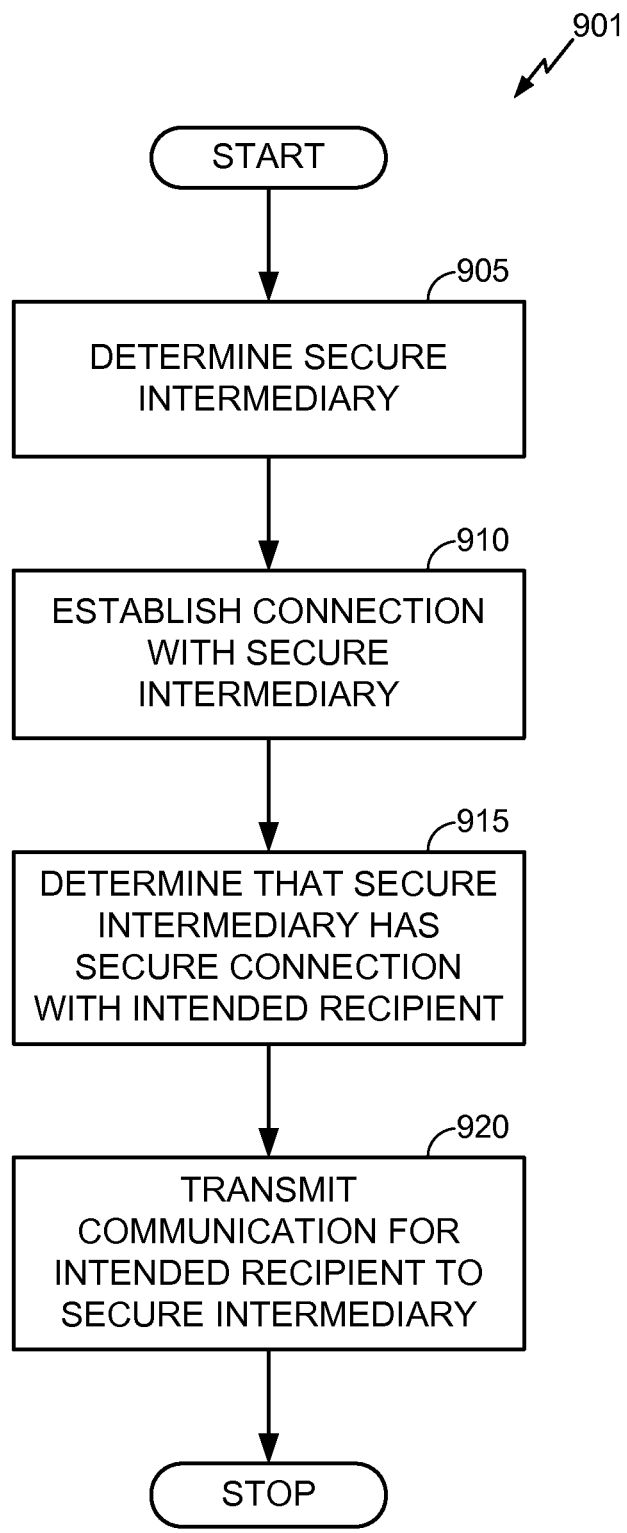
FIG. 9 is a flowchart illustrating an exemplary process of securely communicating between a user equipment and a femto node using a secure gateway as shown in FIG. 5.

FIG. 9 is a flowchart illustrating an exemplary process 901 of securely communicating between a user equipment, such as the UE 521, and a femto node, such as the femto node 510, using a secure gateway, such as the SeGW 515 of FIG. 5. As described above, the UE 521 may not have a direct communication path with the femto node 510. However, a multi-stage secure connection may be established as described herein. In one embodiment, the method 901 may be performed by the UE 521. At step 905, the UE 521 identifies a secure intermediary. In one embodiment, the secure intermediary is the SeGW 515. In one embodiment, the UE 521 uses domain name system (DNS) discovery in order to obtain an IP address for the SeGW 515. In another embodiment, the UE 521 may contact any known SeGW in order to identify the SeGW 515. In this embodiment, the contacted SeGW may use the home AAA and femto AAA in order to identify the SeGW 515 that is serving the femto node 510. In one embodiment the UE 521 may transmit a femto node equipment identifier (FEID) to the contacted SeGW. The contacted SeGW may contact the femto AAA server 530 and use the FEID to determine which SeGW is serving the femto node 510. The contacted SeGW may then communicate this information to the UE 521 so that the UE 521 can contact the correct SeGW 515. If no SeGW for the femto node 510 can be identified, or if the UE 521 is not authorized to communicate with the femto node 510, the process 901 may terminate.

At step 910 the UE 521 establishes a secure connection with the secure intermediary. In one embodiment, the UE 521 may use the Internet Key Exchange version 2 (IKEv2) in order to set up an Internet Protocol Security (IPsec) tunnel between the UE 521 and the SeGW 515. In one embodiment, the security of the link is verified using a pre-shared key-method or the extensible authentication protocol method for 3rd generation authentication and key agreement (EAP-AKA). In one embodiment, if the IPsec tunnel cannot be established, the process 901 terminates.

Continuing at step 915, the UE 521 determines that the secure intermediary has a secure connection with the intended recipient. In one embodiment, the SeGW 515 may have an existing IPsec tunnel with the femto node 510. In another embodiment, the SeGW 515 may be configured to refuse the secure connection with the UE 521 if the there is no secure connection exists between the SeGW 515 and the femto node 910. In this embodiment, the UE 521 may interpret the establishment of a secure connection with the SeGW 515 as implicitly communicating the existence of a secure connection between the SeGW 515 and the femto node 510. Alternatively, the SeGW may be configured to transmit a message to the UE 521 indicating the existence of a secure connection between the SeGW 515 and the femto node 510.

Moving to step 920, the UE 521 transmits a communication intended for the femto node 510 to the SeGW 515. In one embodiment the message may comprise identifiers associated with both the SeGW 515 as the direct recipient and the femto node 510 as the indirect, or final, recipient. The identifier for the SeGW 515 may be placed in an outer header of the one or more packets that make up the communication. The identifier for the femto node 510 may be placed in an inner header of the one or more packets that make up the communication. As described below, the SeGW 515 may perform additional processing on the communication using the identifiers in the inner and outer headers. In one embodiment, the step 920 may be repeated as necessary in order to carry out communications between the UE 521 and the femto node 510. In other embodiments, the flow of communications may be from the femto node 510 to the UE 521. While the process 901 has been described from the perspective of the UE 521, the process 901 may be performed by any network device attempting to establish a secure connection with a distinct network device where no direct communication path is available and a mutually trusted intermediary is available.

Figure 10:
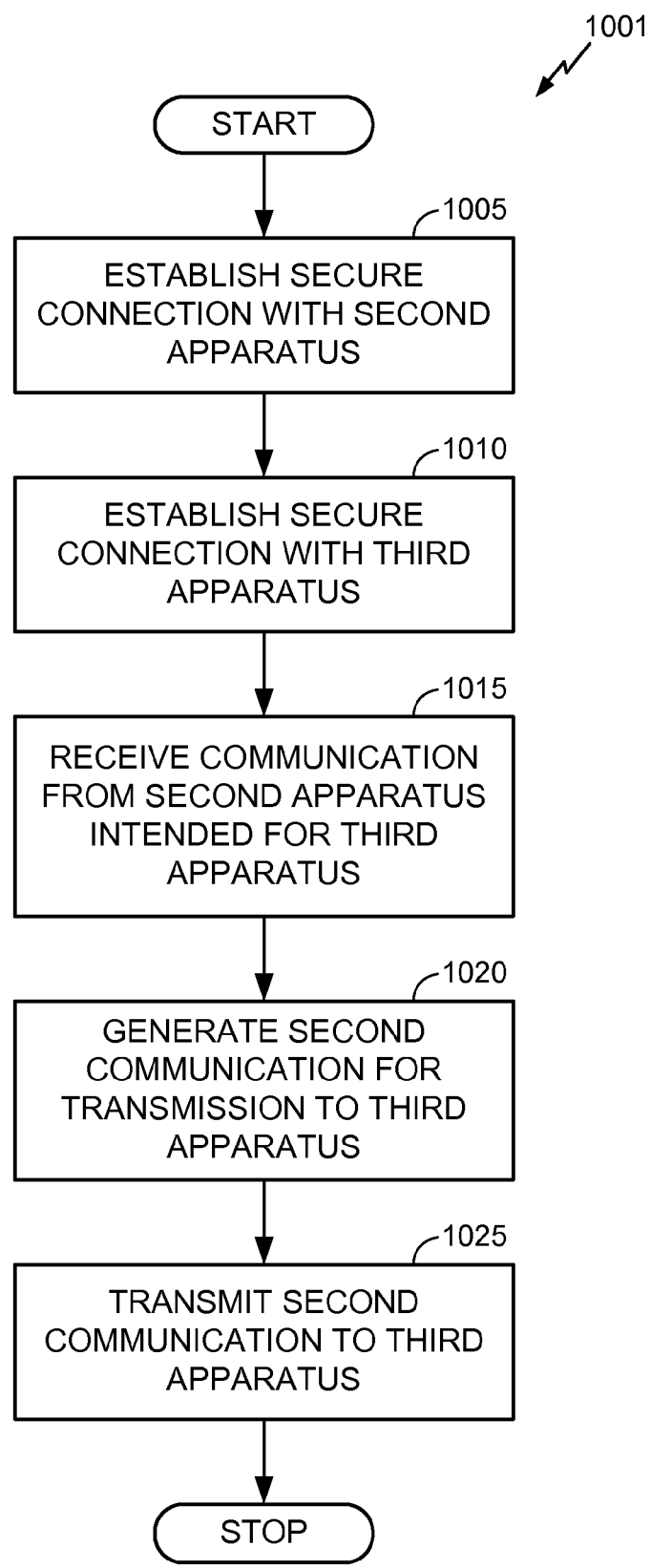
FIG. 10 is a flowchart illustrating another exemplary process of securely communicating between a user equipment and a femto node using a secure gateway as shown in FIG. 5.

FIG. 10 is a flowchart illustrating another exemplary process 1001 of securely communicating between a UE, such as the UE 521, and a femto node, such as the femto node 510, using a SeGW, such as the SeGW 515 of FIG. 5. In one embodiment the process 1001 may be performed by a first apparatus, the SeGW 515. At step 1005, the SeGW 515, establishes a secure connection with a second apparatus. In one example, the second apparatus is the UE 521. The secure connection may be established as described with respect to step 910 of FIG. 9. At step 1010, the SeGW 515 establishes a secure connection with a third apparatus. In one example, the third apparatus is the femto node 510. As described above, the secure connection with the femto node 510 may be established before or after the secure connection with the UE 521 is established. At step 1015, the SeGW 515 receives a communication from the second apparatus, e.g., the UE 521 that is intended for the third apparatus, e.g., the femto node 510. This may be performed as described above with respect to step 920 of FIG. 9.

At step 1020, the SeGW 515 generates a second communication for transmission to the third apparatus, e.g., the femto node 510. In one embodiment, the SeGW 515 may simply repackage the first communication by changing addressing information in the header. For example, the first communication may contain a source identifier associated with the UE 521. Similarly, the first communication may contain destination identifiers corresponding to both the SeGW 515 as a direct destination and the femto node 510 as a final destination. The SeGW 515 may alter the identifiers such that the second communication comprises source identifiers associated with both the UE 521 and the SeGW 515. In one embodiment, the SeGW 515 identifier may be located in an outer header while the UE 521 identifier is located in an inner header. The SeGW 515 may also change the identifiers such the second communication comprises an identifier associated with the femto node 510 as the direct destination. In other embodiments, the SeGW 515 may perform other operations. For example, in one embodiment, the IPsec tunnels between the UE 521 and the SeGW 515 and between the SeGW 515 and the femto node 510 may use encryption corresponding to different keys. Thus, at step 1020 may generate the second communication by decrypting the first communication using a first key associated with the first secure link and by then re-encrypting the unencrypted communication using the second key associated with the second link.

At step 1025, the SeGW 515 transmits the second communication to the third apparatus. The steps 1015, 1020, and 1025 may be repeated as necessary to facilitate communication between the UE 521 and the femto node 510. In other embodiments, the flow of communications may also be in the direction of the femto node 510 to the UE 521. While the process 1001 has been described from the perspective of the SeGW 515, the process 1001 may be performed by any network device acting as a trusted intermediary between two other devices with no direct communication path.

Figure 11:
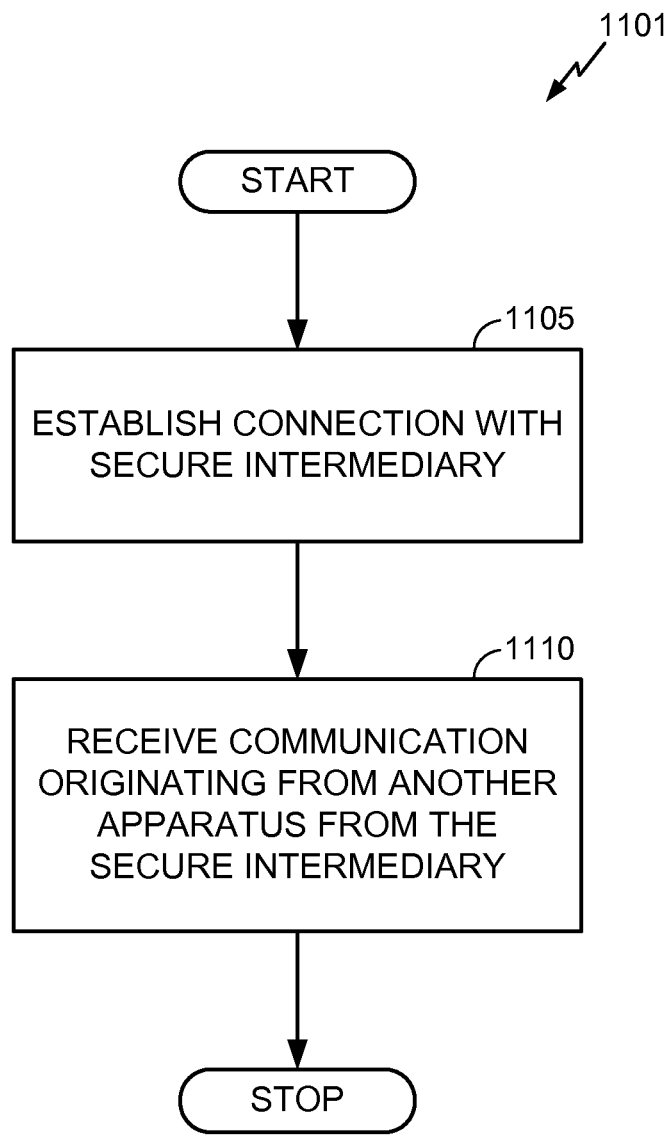
FIG. 11 is a flowchart illustrating another exemplary process of securely communicating between a user equipment and a femto node using a secure gateway as shown in FIG. 5.

FIG. 11 is a flowchart illustrating another exemplary process 1101 for securely communicating between a UE, such as the UE 521, and a femto node, such as the femto node 510, using a SeGW, such as the SeGW 515 of FIG. 5. In one embodiment the process 1101 may be performed by the femto node 510. At step 1105 the femto node 510 establishes a secure connection with an intermediary. In one embodiment, the intermediary is the SeGW 515. The secure connection may be established as described above with respect to step 1010 of FIG. 10. At step 1110, the femto node receives a communication originating from another apparatus, e.g., the UE 521, from the intermediary, e.g., the SeGW 515 over the secure link. The communication may have one or more the properties discussed above with respect to step 1020 of FIG. 10. The step 1110 may be repeated as necessary to facilitate communication between the UE 521 and the femto node 510. In other embodiments, the flow of communications may also be in the direction of the femto node 510 to the UE 521. While the process 1101 has been described from the perspective of the femto node 510, the process 1101 may be performed by any network device attempting to establish a secure connection with a distinct network device where no direct communication path is available and a mutually trusted intermediary is available.

Figure 12:
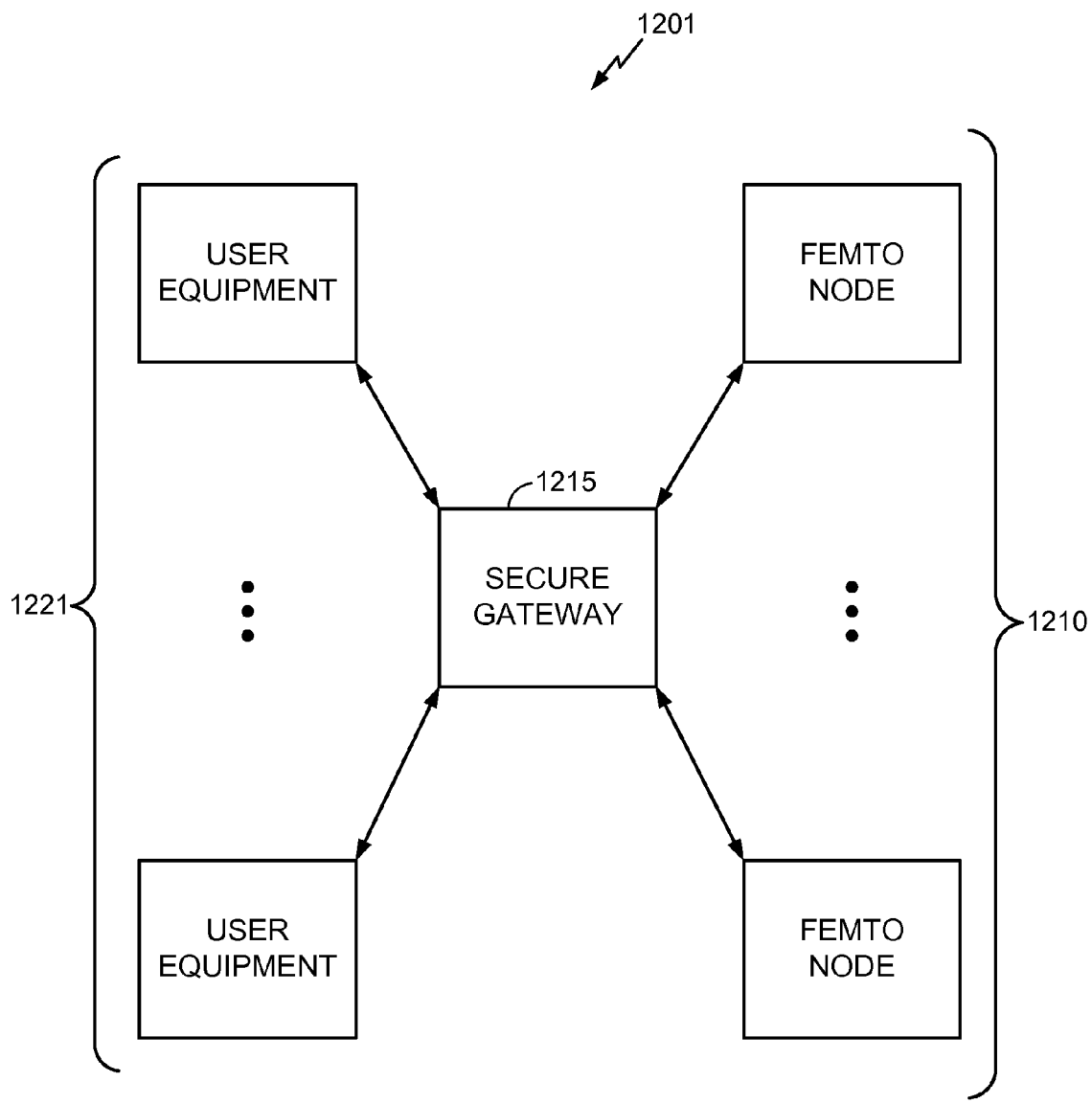
FIG. 12 illustrates additional exemplary operations of a communication network.

FIG. 12 illustrates additional exemplary operations of a communication network 1201. The network 1201 comprises a plurality of UE's 1221. The respective UE's 1221 may be similar to UE 521 of FIG. 5. The UE's 1221 are coupled via wired or wireless communication to the SeGW 1215. The SeGW 1215 may be similar to the SeGW 515. The SeGW 1215 is coupled via wired communication to a plurality of femto nodes 1210. The respective femto nodes 1210 may be similar to the femto node 510. In some embodiments, the SeGW 1215 may act as a trusted intermediary between one or more UE's 1221 and one or more femto nodes 1210. In one embodiment, the SeGW 1215 may act as an intermediary between one of the UE's 1221 and a plurality of the femto nodes 1210. In this embodiment, the SeGW 1215 may be configured to establish a separate secure link, e.g., IPsec tunnel, with the one UE 1221 for each connection with the plurality of femto nodes 1210. In another embodiment, the SeGW 1215 may act as an intermediary between a plurality of the UE's 1221 and one of the femto nodes 1210. In this embodiment, the SeGW 1215 may be configured to establish a separate secure link, e.g., IPsec tunnel, with the one femto node 1215 for each connection with the plurality of UE's 1221. Advantageously, such redundant connections may augment security for communications between the elements of network 1201.

Figure 13:
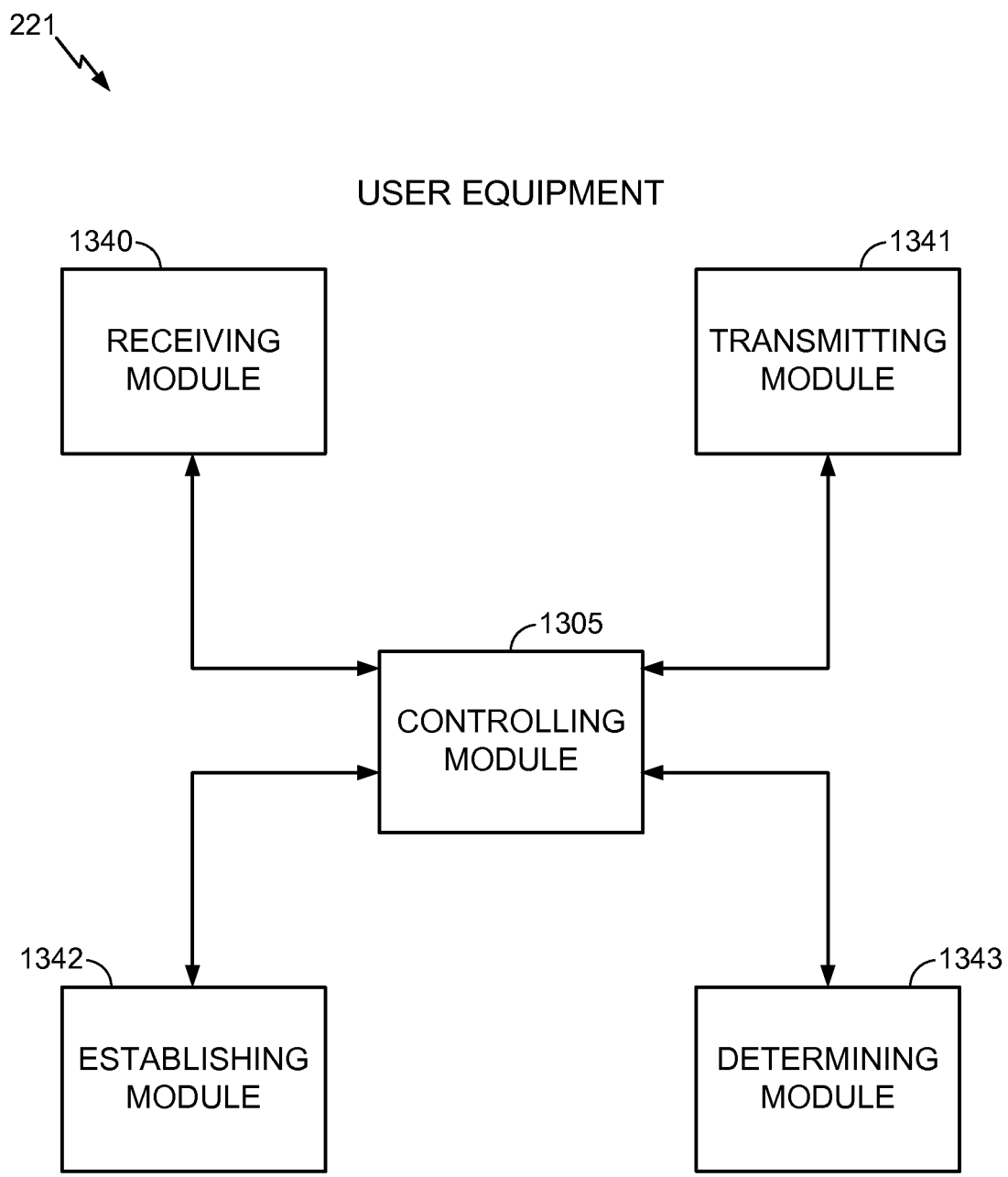
FIG. 13 is a functional block diagram of a third exemplary user equipment in the communication network of FIG. 5.

FIG. 13 is a functional block diagram of an exemplary user equipment in the communication network of FIG. 5. As shown, the UE 221 may comprise a controlling module 1305, a receiving module 1340, a transmitting module 1341, an establishing module 1342, and a determining module 1343. The controlling module 1305 may correspond at least in some aspects to, for example, a processor or a processing module as discussed herein. The receiving module 1340 may correspond at least in some aspects to, for example, a receiver or a receiving module as discussed herein. The transmitting module 1341 may correspond at least in some aspects to, for example, a transmitter or a transmitting module as discussed herein. The establishing module 1342 may correspond at least in some aspects to, for example, a processor or a processing module as discussed herein. The determining module 1343 may correspond at least in some aspects to, for example, a processor or a processing module as discussed herein.

Figure 14:
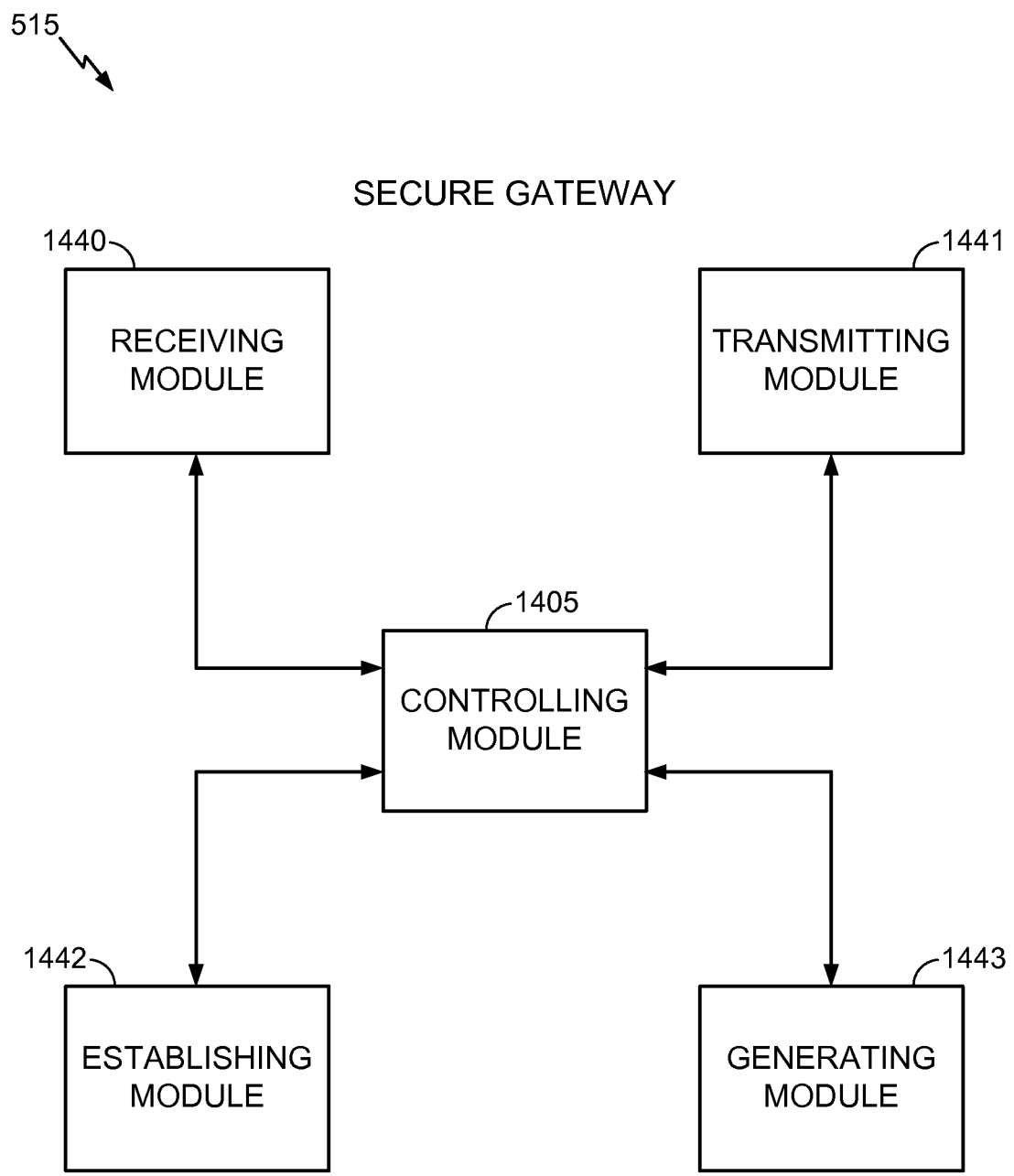
FIG. 14 is a functional block diagram of a second exemplary secure gateway in the communication network of FIG. 5.

FIG. 14 is a functional block diagram of an exemplary SeGW in the communication network of FIG. 5. As shown, the SeGW 515 may comprise a controlling module 1405, a receiving module 1440, a transmitting module 1441, an establishing module 1442, and a generating module 1443. The controlling module 1405 may correspond at least in some aspects to, for example, a processor or a processing module as discussed herein. The receiving module 1440 may correspond at least in some aspects to, for example, a receiver or a receiving module as discussed herein. The transmitting module 1441 may correspond at least in some aspects to, for example, a transmitter or a transmitting module as discussed herein. The establishing module 1442 may correspond at least in some aspects to, for example, a processor or a processing module as discussed herein. The generating module 1443 may correspond at least in some aspects to, for example, a processor or a processing module as discussed herein.

Figure 15:
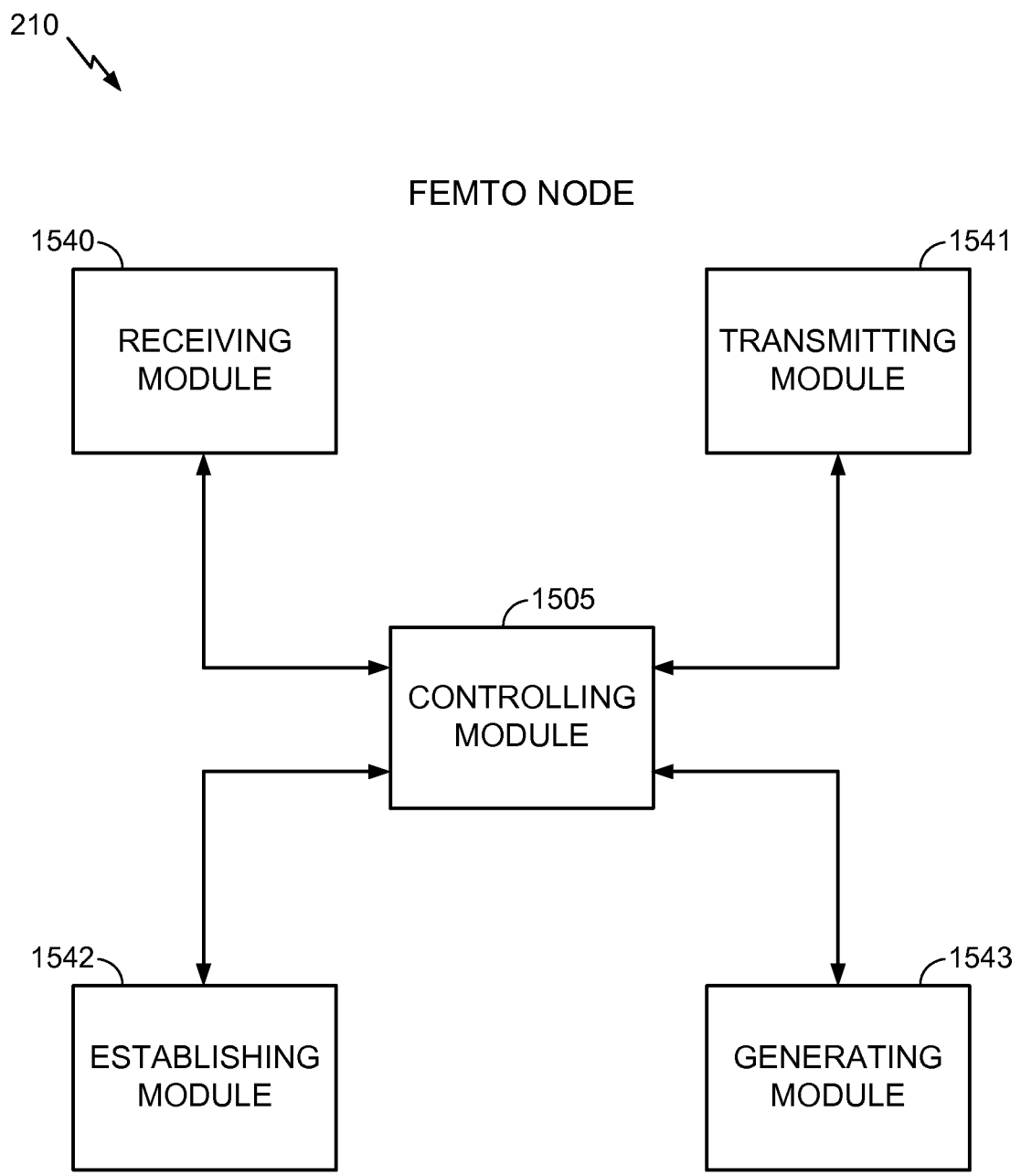
FIG. 15 is a functional block diagram of a third exemplary femto node in the communication network of FIG. 5.

FIG. 15 is a functional block diagram of an exemplary femto node in the communication network of FIG. 5. As shown, the femto node 210 may comprise a controlling module 1505, a receiving module 1540, a transmitting module 1541, an establishing module 1542, and a generating module 1543. The controlling module 1505 may correspond at least in some aspects to, for example, a processor or a processing module as discussed herein. The receiving module 1540 may correspond at least in some aspects to, for example, a receiver or a receiving module as discussed herein. The transmitting module 1541 may correspond at least in some aspects to, for example, a transmitter or a transmitting module as discussed herein. The establishing module 1542 may correspond at least in some aspects to, for example, a processor or a processing module as discussed herein. The generating module 1543 may correspond at least in some aspects to, for example, a processor or a processing module as discussed herein.

The functionality of the modules of FIGS. 6-8 and 13-15 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

The embodiments presented herein and other embodiments are further described in greater detail in the attached Appendix. While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method of wireless communication comprising:
   identifying, by a user equipment (UE), based on a femto node equipment identifier (FEID) associated with a femto node, from among a plurality of security gateways for communicating with the femto node, which of the plurality of security gateways is a security gateway that has formed a first secure communication link with the femto node, wherein the first secure communication link was established prior in time to the identifying, and is persistent once it is established between the security gateway and the femto node;
   establishing, by the UE, a second secure communication link with the security gateway, wherein the second secure communication link is established in response to the UE attempting to communicate with the femto node;
   receiving, by the UE, an indication from the security gateway that the first secure communication link was previously established; and
   transmitting, by the UE, a communication to the security gateway via the second secure communication link for retransmission to the femto node via the first secure communication link by the security gateway;
   wherein the communication comprises the FEID associated with the femto node to indicate the intended recipient of the communication.

2. The method of claim 1, further comprising determining, by the UE, that a direct secure connection between the UE and the femto node is unavailable.

3. The method of claim 1, wherein identifying further comprises:
   transmitting, by the UE, a second communication to a fourth apparatus, the second communication comprising identifying information associated with the femto node to indicate the intended recipient of the second communication; and
   receiving, by the UE, a third communication from the fourth apparatus, the third communication comprising identifying information associated with the security gateway.

4. The method of claim 1, wherein the first and second secure communication links comprise respective Internet Protocol Security (IPsec) tunnels.

5. The method of claim 1, wherein establishing the second secure communication link with the security gateway is performed according to Internet Key Exchange version 2 (IKEv2).

6. The method of claim 1, wherein the communication comprises an outer header containing an identifier associated with the security gateway and an inner header comprising the FEID associated with the femto node.

7. The method of claim 1, wherein the identifying which of the plurality of security gateways is the security gateway that has formed the first secure communication link with the femto node comprises determining the security gateway based on an association between the FEID and an address of the security gateway, which is stored at a network server.

8. The method of claim 1, wherein the security gateway directly serves the femto node such that the security gateway is the only apparatus capable of forming the first secure communication link with the femto node.

9. An apparatus for wireless communication comprising:
   a processor configured to:
      identify, based on a femto node equipment identifier (FEID) associated with a femto node, from among a plurality of security gateways for communicating with the femto node, which of the plurality of security gateways is a security gateway that has formed a first secure communication link with the femto node, wherein the first secure communication link was established prior in time to the security gateway being identified, and is persistent once it is established between the security gateway and the femto node; and
      establish a second secure communication link with the security gateway, wherein the second secure communication link is established in response to the apparatus attempting to communicate with the femto node;
   a receiver configured to receive an indication from the security gateway that the first secure communication link was previously established; and a transmitter configured to transmit a communication to the security gateway via the second secure communication link for retransmission to the femto node via the first secure communication link by the security gateway;

wherein the communication comprises the FEID associated with the femto node to indicate the intended recipient of the communication.

10. The apparatus of claim 9, wherein the processor is further configured to determine that a direct secure connection between the apparatus and the femto node is unavailable.

11. The apparatus of claim 9:
wherein the transmitter is further configured to transmit a second communication to a fourth apparatus, the second communication comprising identifying information associated with the femto node to indicate the intended recipient of the second communication;
wherein the receiver is further configured to receive a third communication from the fourth apparatus, the third communication comprising identifying information associated with the security gateway; and
wherein the processor is configured to identify the security gateway based, at least in part, on the identifying information associated with the security gateway.

12. The apparatus of claim 9, wherein the first and second secure communication links comprise respective Internet Protocol Security (IPsec) tunnels.

13. The apparatus of claim 9, wherein the processor is configured to establish the second secure communication link with the security gateway according to Internet Key Exchange version 2 (IKEv2).

14. The apparatus of claim 9, wherein the communication comprises an outer header containing an identifier associated with the security gateway and an inner header comprising the FEID associated with the femto node.

15. The apparatus of claim 9, wherein the processor configured to identify which of the plurality of security gateways is the security gateway that has formed the first secure communication link with the femto node is further configured to determine the security gateway based on an association between the FEID and an address of the security gateway, which is stored at a network server.

16. The apparatus of claim 9, wherein the security gateway directly serves the femto node such that the security gateway is the only apparatus capable of forming the first secure communication link with the femto node.

17. An apparatus for wireless communication comprising:
means for identifying, based on a femto node equipment identifier (FEID) associated with a femto node, from among a plurality of security gateways for communicating with a femto node, which of the plurality of security gateways is a security gateway that has formed a first secure communication link with the femto node, wherein the first secure communication link was established prior in time to the security gateway being identified, and is persistent once it is established between the security gateway and the femto node;
means for establishing a second secure communication link with the security gateway, wherein the second secure communication link is established in response to the apparatus attempting to communicate with the femto node;
means for receiving an indication from the security gateway that the first secure communication link was previously established; and
means for transmitting a communication to the security gateway via the second secure communication link for retransmission to the femto node via the first secure communication link by the security gateway;

wherein the communication comprises the FEID associated with the femto node, to indicate the intended recipient of the communication.

18. The apparatus of claim 17, further comprising means for determining that a direct secure connection between the apparatus and the femto node is unavailable.

19. The apparatus of claim 17, further comprising:
means for transmitting a second communication to a fourth apparatus, the second communication comprising identifying information associated with the femto node to indicate the intended recipient of the second communication; and
means for receiving a third communication from the fourth apparatus, the third communication comprising identifying information associated with the security gateway; and
wherein identifying the security gateway is performed based, at least in part, on the identifying information associated with the security gateway.

20. The apparatus of claim 17, wherein the first and second secure communication links comprise respective Internet Protocol Security (IPsec) tunnels.

21. The apparatus of claim 17, wherein establishing the second secure communication link with the security gateway is performed according to Internet Key Exchange version 2 (IKEv2).

22. The apparatus of claim 17, wherein the communication comprises an outer header containing an identifier associated with the security gateway and an inner header comprising the FEID associated with the femto node.

23. The apparatus of claim 17, wherein the means for identifying which of the plurality of security gateways is the security gateway that has formed the first secure communication link with the femto node comprises means for determining the security gateway based on an association between the FEID and an address of the security gateway, which is stored at a network server.

24. The apparatus of claim 17, wherein the security gateway directly serves the femto node such that the security gateway is the only apparatus capable of forming the first secure communication link with the femto node.

25. A computer program product, comprising:
a non-transitory computer-readable medium comprising:
code for causing a computer to identify, based on a femto node equipment identifier (FEID) associated with a femto node, from among a plurality of security gateways for communicating with the femto node, which of the plurality of security gateways is a security gateway that has formed a first secure communication link with the femto node, wherein the first secure communication link was established prior in time to the security gateway being identified, and is persistent once it is established between the security gateway and the femto node;
code for causing a computer to establish a second secure communication link between a user equipment (UE) and the security gateway, wherein the second secure communication link is established in response to the UE attempting to communicate with the femto node;
code for causing a computer to receive an indication from the security gateway that the first secure communication link was previously established; and
code for causing a computer to transmit a communication to the security gateway via the second secure communication link for retransmission to the femto node via the first secure communication link by the security gateway;

wherein the communication comprises the FEID associated with the femto node to indicate the intended recipient of the communication.

26. The computer program product of claim 25, wherein the computer-readable medium further comprises code for causing a computer to determine that a direct secure connection between the UE and the femto node is unavailable.

27. The computer program product of claim 25, wherein the computer-readable medium further comprises:

code for causing a computer to transmit a second communication to a fourth apparatus, the second communication comprising identifying information associated with the femto node to indicate the intended recipient of the second communication; and code for causing a computer to receive a third communication from the fourth apparatus, the third communication comprising identifying information associated with the security gateway; and wherein identifying the security gateway is performed based, at least in part, on the identifying information associated with the security gateway.

28. The computer program product of claim 25, wherein the first and second secure communication links comprise respective Internet Protocol Security (IPsec) tunnels.

29. The computer program product of claim 25, wherein establishing the second secure communication link with the security gateway is performed according to Internet Key Exchange version 2 (IKEv2).

30. The computer program product of claim 25, wherein the communication comprises an outer header containing an identifier associated with the security gateway and an inner header comprising the FEID associated with the femto node.

31. The computer program product of claim 25, wherein the code for causing a computer identify which of the plurality of security gateways is the security gateway that has formed the first secure communication link with the femto node comprises code for causing a computer to determine the security gateway based on an association between the FEID and an address of the security gateway, which is stored at a network server.

32. The computer program product of claim 25, wherein the security gateway directly serves the femto node such that the security gateway is the only apparatus capable of forming the first secure communication link with the femto node.

33. A method of wireless communication comprising:

detecting, by a security gateway, a first secure communication link with a user equipment (UE), wherein the first secure communication link was established in response to the UE attempting to communicate with a femto node and in response to the UE identifying, based on a femto node equipment identifier (FEID) associated with the femto node, from among a plurality of security gateways for communicating with the femto node, which of the plurality of security gateways is the security gateway, and wherein the security gateway has established a second secure communication link with the femto node prior to the identifying;

wherein the second secure communication link was established prior in time to the detecting, and is persistent once it is established between the security gateway and the femto node;

receiving, by the security gateway, a first communication from the UE via the first secure communication link, the first communication comprising the FEID associated with the femto node to indicate the intended recipient of the communication;

generating, by the security gateway, a second communication based, at least in part, on the first communication and the FEID associated with the femto node; and transmitting, by the security gateway, the second communication to the femto node.

34. The method of claim 33, wherein the first and second secure communication links comprise respective Internet Protocol Security (IPsec) tunnels.

35. The method of claim 33, wherein the first secure communication link and the second secure communication link are established according to Internet Key Exchange version 2 (IKEv2).

36. The method of claim 33, wherein the first communication comprises an outer header containing an identifier associated with the security gateway and an inner header comprising the FEID associated with the femto node.

37. The method of claim 33, wherein the second communication comprises an outer header containing an identifier associated with the security gateway and an inner header comprises an identifier associated with the UE.

38. The method of claim 33, further comprising decrypting, by the security gateway, the first communication using a key associated with the first secure communication link.

39. The method of claim 38, wherein generating the second communication comprises, encrypting, by the security gateway, a portion of the decrypted first communication using a key associated with the second secure communication link.

40. An apparatus for wireless communication comprising:

a processor configured to:

detect a first secure communication link with a UE, wherein the first secure communication link was established in response to the UE attempting to communicate with a femto node and in response to the UE identifying, based on a femto node equipment identifier (FEID) associated with the femto node, from among a plurality of security gateways for communicating with the femto node, which of the plurality of security gateways is the apparatus, and wherein the apparatus has established a second secure communication link with the femto node prior to the identifying;

wherein the second secure communication link was established prior in time to the first secure communication link being detected, and is persistent once it is established between the apparatus and the femto node;

a receiver configured to receive a first communication from the UE via the first secure communication link, the first communication comprising the FEID associated with the femto node to indicate the intended recipient of the first communication;

wherein the processor is further configured to generate a second communication based, at least in part, on the first communication and the FEID associated with the femto node; and a transmitter configured to transmit the second communication to the femto node.

41. The apparatus of claim 40, wherein the first and second secure communication links comprise respective Internet Protocol Security (IPsec) tunnels.

42. The apparatus of claim 40, wherein the first secure communication link and the second secure communication link are established according to Internet Key Exchange version 2 (IKEv2).

43. The apparatus of claim 40, wherein the first communication comprises an outer header containing an identifier associated with the first apparatus and an inner header comprising the FEID associated with the femto node.

44. The apparatus of claim 40, wherein the second communication comprises an outer header containing an identifier associated with the first apparatus and an inner header comprising an identifier associated with the UE.

45. The apparatus of claim 40, wherein the processor is further configured to decrypt the first communication using a key associated with the first secure communication link.

46. The apparatus of claim 45, wherein the processor is further configured to encrypt a portion of the decrypted first communication using a key associated with the second secure communication link.

47. An apparatus for wireless communication comprising:
   means for detecting a first secure communication link with a UE, wherein the first secure communication link was established in response to the UE attempting to communicate with a femto node and in response to the UE identifying, based on a femto node equipment identifier (FEID) associated with the femto node, from among a plurality of security gateways for communicating with the femto node, which of the plurality of security gateways is the apparatus, and wherein the apparatus has established a second secure communication link with the femto node prior to the identifying;
      wherein the second secure communication link was established prior in time to the first secure communication link being detected, and is persistent once it is established between the apparatus and the femto node;
   means for receiving a first communication from the UE via the first secure communication link, the first communication comprising the FEID associated with the femto node to indicate the intended recipient of the first communication;
   means for generating a second communication based, at least in part, on the first communication and the FEID associated with the femto node; and
   means for transmitting the second communication to the femto node.

48. The apparatus of claim 47, wherein the first and second secure communication links comprise respective Internet Protocol Security (IPsec) tunnels.

49. The apparatus of claim 47, wherein the first secure communication link and the second secure communication link are established according to Internet Key Exchange version 2 (IKEv2).

50. The apparatus of claim 47, wherein the first communication comprises an outer header containing an identifier associated with the apparatus and an inner header comprising the FEID associated with the femto node.

51. The apparatus of claim 47, wherein the second communication comprises an outer header containing an identifier associated with the apparatus and an inner header comprising an identifier associated with the UE.

52. The apparatus of claim 47, further comprising means for decrypting the first communication using a key associated with the first secure communication link.

53. The apparatus of claim 52, further comprising means for encrypting a portion of the decrypted first communication using a key associated with the second secure communication link.

54. A computer program product comprising
   a non-transitory computer-readable medium comprising:
      code for causing a computer to detect a first secure communication link between a security gateway and a UE, wherein the first secure communication link was established in response to the UE attempting to communicate with a femto node and in response to the UE identifying, based on a femto node equipment identifier (FEID) associated with the femto node, from among a plurality of security gateways for communicating with the femto node, which of the plurality of security gateways is the security gateway, and wherein the security gateway has established a second secure communication link with the femto node prior to the identifying;
      wherein the second secure communication link was established prior in time to the first secure communication link being detected, and is persistent once it is established between the security gateway and the femto node;
      code for causing a computer to receive a first communication from the UE via the first secure communication link, the first communication comprising the FEID associated with the femto node to indicate the intended recipient of the first communication;
      code for causing a computer to generate a second communication based, at least in part, on the first communication and the FEID associated with the femto node; and
      code for causing a computer to transmit the second communication to the femto node.

55. The computer program product of claim 54, wherein the first and second secure communication links comprise respective Internet Protocol Security (IPsec) tunnels.

56. The computer program product of claim 54, wherein the first secure communication link and the second secure communication link are established according to Internet Key Exchange version 2 (IKEv2).

57. The computer program product of claim 54, wherein the first communication comprises an outer header containing an identifier associated with the security gateway and an inner header comprising the FEID associated with the femto node.

58. The computer program product of claim 54, wherein the second communication comprises an outer header containing an identifier associated with the security gateway and an inner header comprising an identifier associated with the UE.

59. The computer program product of claim 54, wherein the computer program product further comprises code for causing a computer to decrypt the first communication using a key associated with the first secure communication link.

60. The computer program product of claim 59, wherein the computer program product further comprises code for causing a computer to encrypt a portion of the decrypted first communication using a key associated with the second secure communication link.

61. A method of wireless communication comprising:
   detecting by a femto node, a first secure communication link with a security gateway, wherein the first secure communication link was established prior in time, and is persistent once it is established between the femto node and the security gateway; and
   receiving, by the femto node, a first communication from the security gateway via the first secure communication link;
   wherein the first communication comprises a femto node equipment identifier (FEID) associated with the femto node and an identifier associated with a user equipment (UE) which transmitted the first communication to the security gateway via a second secure communication link, wherein the second secure communication link was established in response to the UE attempting to communicate with the femto node and in response to the UE identifying, based on the FEID associated with the femto node, from among a plurality of security gateways for communicating with the UE, which of the plurality of security gateways is the security gateway, and wherein the security gateway has established the first secure communication link with the femto node prior to the identifying.

62. The method of claim 61, wherein the first and second secure communication links comprise respective Internet Protocol Security (IPsec) tunnels.

63. The method of claim 61, wherein detecting the first secure communication link with the security gateway is performed according to Internet Key Exchange version 2 (IKEv2).

64. The method of claim 61, wherein the first communication comprises an outer header containing an identifier associated with the security gateway and an inner header comprising the identifier associated with the UE.

65. A femto node for wireless communication comprising:
a processor configured to detect a first secure communication link between the femto node and a security gateway, wherein the first secure communication link was established prior in time, and is persistent once it is established between the femto node and the security gateway; and
a receiver configured to receive a first communication from the security gateway via the first secure communication link;
wherein the first communication comprises a femto node equipment identifier (FEID) associated with the femto node and an identifier associated with a user equipment (UE) which transmitted the first communication to the security gateway via a second secure communication link, wherein the second secure communication link was established in response to the UE attempting to communicate with the femto node and in response to the UE identifying, based on the FEID associated with the femto node, from among a plurality of security gateways for communicating with the UE, which of the plurality of security gateways is the security gateway, and wherein the security gateway has established the first secure communication link with the femto node prior to the identifying.

66. The femto node of claim 65, wherein the first and second secure communication links comprise respective Internet Protocol Security (IPsec) tunnels.

67. The femto node of claim 65, wherein detecting the first secure communication link with the security gateway is performed according to Internet Key Exchange version 2 (IKEv2).

68. The femto node of claim 65, wherein the first communication comprises an outer header containing an identifier associated with the security gateway and an inner header comprising the identifier associated with the UE.

69. A femto node for wireless communication comprising:
means for detecting a first secure communication link between the femto node and a security gateway, wherein the first secure communication link was established prior in time, and is persistent once it is established between the femto node and the security gateway; and
means for receiving a first communication from the security gateway via the first secure communication link;
wherein the first communication comprises a femto node equipment identifier (FEID) associated with the femto node and an identifier associated with a user equipment (UE) which transmitted the first communication to the security gateway via a second secure communication link, wherein the second secure communication link was established in response to the UE attempting to communicate with the femto node and in response to the UE identifying, based on the FEID associated with the femto node, from among a plurality of security gateways for communicating with the UE, which of the plurality of security gateways is the security gateway, and wherein the security gateway has established the first secure communication link with the femto node prior to the identifying.

70. The femto node of claim 69, wherein the first and second secure communication links comprise respective Internet Protocol Security (IPsec) tunnels.

71. The femto node of claim 69, wherein detecting the first secure communication link with the security gateway is performed according to Internet Key Exchange version 2 (IKEv2).

72. The femto node of claim 69, wherein the first communication comprises an outer header containing an identifier associated with the security gateway and an inner header comprising the identifier associated with the UE.

73. A computer program product comprising:
a non-transitory computer-readable medium comprising:
code for causing a computer to detect a first secure communication link between a femto node and a security gateway, wherein the first secure communication link was established prior in time, and is persistent once it is established between the femto node and the security gateway; and
code for causing a computer to receive a first communication from the security gateway via the first secure communication link;
wherein the first communication comprises a femto node equipment identifier (FEID) associated with the femto node and an identifier associated with a user equipment (UE) which transmitted the first communication to the security gateway via a second secure communication link, wherein the second secure communication link was established in response to the UE attempting to communicate with the femto node and in response to the UE identifying, based on the FEID associated with the femto node, from among a plurality of security gateways for communicating with the UE, which of the plurality of security gateways is the security gateway, and wherein the security gateway has established the first secure communication link with the femto node prior to the identifying.

74. The computer program product of claim 73, wherein the first and second secure communication links comprise respective Internet Protocol Security (IPsec) tunnels.

75. The computer program product of claim 73, wherein detecting the first secure communication link with the security gateway is performed according to Internet Key Exchange version 2 (IKEv2).

76. The computer program product of claim 73, wherein the first communication comprises an outer header containing an identifier associated with the security gateway and an inner header comprising the identifier associated with the UE.

* * * * *